United States Patent
Yapel et al.

(10) Patent No.: US 10,156,661 B2
(45) Date of Patent: *Dec. 18, 2018

(54) LIGHT REDIRECTING FILM AND DISPLAY SYSTEM INCORPORATING SAME

(75) Inventors: Robert A. Yapel, Oakdale, MN (US); Joseph T. Aronson, Menomonie, WI (US); Matthew R. C. Atkinson, Cottage Grove, MN (US); Gary T. Boyd, Woodbury, MN (US); Slah Jendoubi, Fridley, MN (US); Mitchell A. F. Johnson, Maplewood, MN (US); Scott R. Kaytor, Woodbury, MN (US); Steven H. Kong, Woodbury, MN (US); Fei Lu, Woodbury, MN (US); Tri D. Pham, Oakdale, MN (US); Robert B. Secor, Stillwater, MN (US); Steven D. Solomonson, Shoreview, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1377 days.

This patent is subject to a terminal disclaimer.

(21) Appl. No.: 13/700,572

(22) PCT Filed: May 17, 2011

(86) PCT No.: PCT/US2011/036825
§ 371 (c)(1),
(2), (4) Date: Nov. 28, 2012

(87) PCT Pub. No.: WO2011/149715
PCT Pub. Date: Dec. 1, 2011

(65) Prior Publication Data
US 2013/0070341 A1    Mar. 21, 2013

Related U.S. Application Data

(60) Provisional application No. 61/349,234, filed on May 28, 2010.

(51) Int. Cl.
*G02B 13/20* (2006.01)
*G02B 27/00* (2006.01)
(Continued)

(52) U.S. Cl.
CPC ............. *G02B 1/10* (2013.01); *G02B 5/0221* (2013.01); *G02B 5/0242* (2013.01); *G02B 5/0268* (2013.01); *G02B 5/0278* (2013.01)

(58) Field of Classification Search
CPC ... G02B 5/00; G02B 5/02; G02B 5/04; G02B 1/10; G02B 1/118; G02B 1/12;
(Continued)

(56) References Cited

U.S. PATENT DOCUMENTS 6,164,785 A    12/2000  Maekawa
7,341,355 B2 *  3/2008  Namioka ............. G02B 5/0221
                                                    359/599
(Continued)

FOREIGN PATENT DOCUMENTS

JP    2003-004903    1/2003
JP    2005092197 A   4/2005
(Continued)

*Primary Examiner* — Thong Nguyen
(74) *Attorney, Agent, or Firm* — Clifton F. Richardson

(57) ABSTRACT

An optical film having a structured surface is described. At least 90% of the structured surface has a slope magnitude that is less than about 5 degrees. The optical film may have an optical haze of less than about 10% and an optical clarity of less than about 50%, or may have an optical haze of less than about 7.5% and an optical clarity of less than about 60%, or may have an optical haze of less than about 3% and an optical clarity of less than about 65%.

16 Claims, 23 Drawing Sheets

(51) Int. Cl.
*G02B 1/10* (2015.01)
*G02B 5/02* (2006.01)

(58) Field of Classification Search
CPC .. G02B 5/0221; G02B 5/0231; G02B 5/0242; G02B 5/0268; G02B 5/0278; G02B 5/0284; G02B 5/0289; G02B 27/00; G02B 27/0018; F21V 5/00; F21V 5/02
See application file for complete search history.

(56) References Cited

U.S. PATENT DOCUMENTS

| | | | |
|---|---|---|---|
| 7,583,342 B2 | 9/2009 | Maruyama | |
| 8,657,472 B2* | 2/2014 | Aronson | G02B 5/02 359/536 |
| 2007/0046864 A1 | 3/2007 | Maruyama et al. | |
| 2007/0121211 A1* | 5/2007 | Watanabe | G02B 1/11 359/601 |
| 2007/0207298 A1 | 9/2007 | Suzuki | |
| 2007/0217015 A1 | 9/2007 | Furuya | |
| 2008/0137206 A1 | 6/2008 | Nakamura | |
| 2008/0212005 A1* | 9/2008 | Miyauchi | G02B 1/111 349/137 |
| 2009/0029054 A1 | 1/2009 | Yapel | |
| 2009/0080082 A1* | 3/2009 | Matsunaga | G02B 5/0221 359/609 |
| 2009/0147196 A1 | 6/2009 | Horie | |
| 2009/0297773 A1 | 12/2009 | Wang | |
| 2010/0062225 A1 | 3/2010 | Takahashi et al. | |
| 2010/0246011 A1 | 9/2010 | Ohishi | |
| 2011/0280004 A1 | 11/2011 | Shimada | |
| 2013/0201660 A1* | 8/2013 | Barbier | B32B 33/00 362/97.1 |

FOREIGN PATENT DOCUMENTS

| | | |
|---|---|---|
| JP | 2005-195819 | 7/2005 |
| JP | 2006-103070 | 4/2006 |
| JP | 2009-265143 | 11/2009 |
| JP | 2010-032739 | 2/2010 |
| JP | 2010-224427 | 10/2010 |
| WO | WO 99-36248 | 7/1999 |
| WO | WO 2008020610 A1 | 2/2008 |
| WO | WO 150259 | 12/2008 |

* cited by examiner

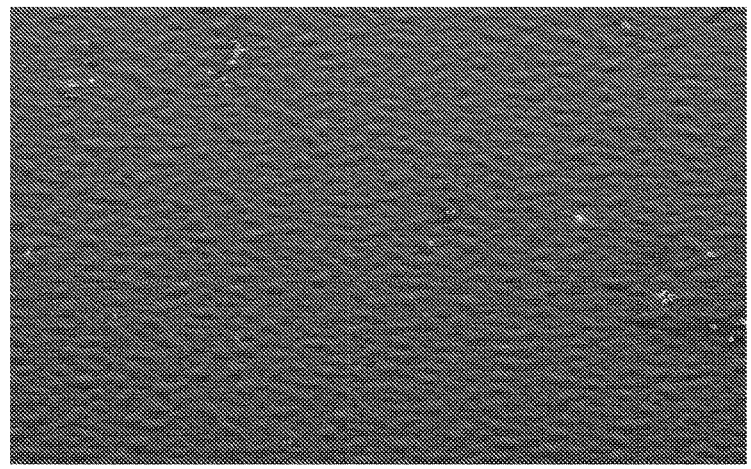
*Fig. 26*  500 µm
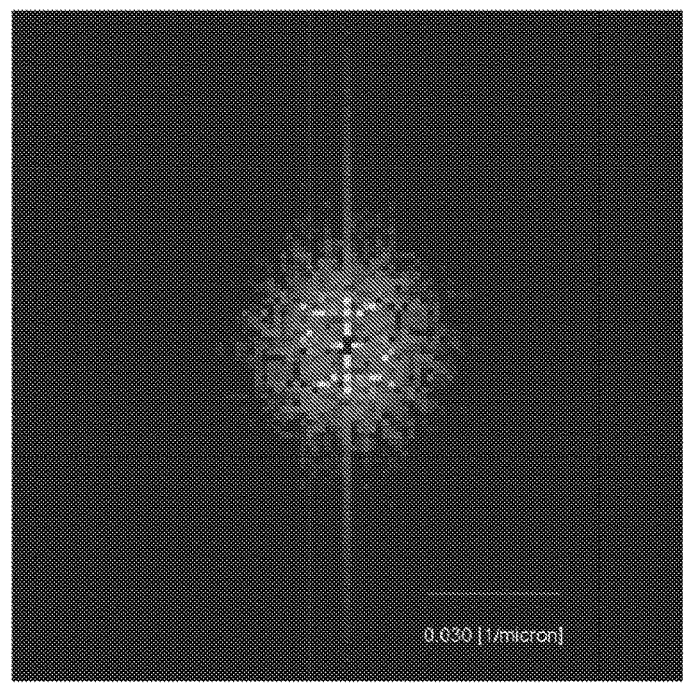
*Fig. 27*

LIGHT REDIRECTING FILM AND DISPLAY SYSTEM INCORPORATING SAME

FIELD OF THE INVENTION

This description generally relates to optical film for redirecting light. This description is further applicable to optical systems, such as display systems, incorporating such optical films.

BACKGROUND

Display systems, such as liquid crystal display (LCD) systems, are used in a variety of applications and commercially available devices such as, for example, computer monitors, personal digital assistants (PDAs), mobile phones, miniature music players, and thin LCD televisions. Most LCDs include a liquid crystal panel and an extended area light source, often referred to as a backlight, for illuminating the liquid crystal panel. Backlights typically include one or more lamps and a number of light management films such as, for example, lightguides, mirror films, light redirecting films, retarder films, light polarizing films, and diffuser films. Diffuser films are typically included to hide optical defects and improve the brightness uniformity of the light emitted by the backlight.

SUMMARY

In one aspect, the present description relates to an optical film that has a structured surface. The optical film has an optical haze of less than about 10% and an optical clarity of less than about 50%. At least 85% of the structured surface of the film has a slope magnitude that is less than about 7.5 degrees.

In another aspect, the present invention relates to an optical film that has a structured surface. The optical film has an optical haze of less than about 7.5% and an optical clarity of less than about 60%. At least 90% of the structured surface of the film has a slope magnitude that is less than about 7.5 degrees. The film also is made up in part of a plurality of particles having an average size that is less than about 0.5 microns.

In a third aspect, the present description relates to an optical film that has a structured surface. The optical film has an optical haze of less than about 5% and an optical clarity of less than about 70%. At least 85% of the structured surface of the film has a slope magnitude that is less than about 5 degrees. The film also is made up in part of a plurality of particles having an average size that is less than about 0.5 microns.

In another aspect, the present description relates to an optical film that has a structured surface. The optical film has an optical haze of less than about 3% and an optical clarity of less than about 65%. At least 90% of the structured surface of the film has a slope magnitude that is less than about 5 degrees.

In yet another aspect, the present description relates to an optical film that has a structured surface. The optical film has an optical haze of less than about 1.5% and an optical clarity of less than about 80%. At least 80% of the structured surface of the film has a slope magnitude that is less than about 2.5 degrees.

In another aspect, the present description relates to an optical film that has a structured surface. The optical film has an optical haze of less than about 1% and an optical clarity of less than about 90%. At least 90% of the structured surface of the film has a slope magnitude that is less than about 4 degrees.

In another aspect, the present description relates to an optical film that has a structured surface. The optical film has an optical haze of less than about 20% and an optical clarity of less than about 40%. At least 90% of the structured surface of the film has a slope magnitude that is less than about 10 degrees.

In one further aspect, the present description relates to an optical film that has a first and second structured surface. The first structured surface has a plurality of prismatic structures, and the second structured surface opposes the first structured surface and has a plurality of microstructures. The effective transmission of the film is not more than 1% less than a film with a comparable construction except for a smooth, non-structured second surface.

In a separate aspect, the present description relates to an optical film stack that has a first optical film and a second optical film disposed on the first optical film, the second optical film being optically coupled to the first optical film. The second optical film has a structured surface. The effective transmission of the film stack is not more than 1% less than a film stack with a comparable construction except for a second optical film with a smooth rather than structured surface.

In another aspect, the present description relates to an optical film having a plurality of microstructures randomly distributed on its surface. 50% of the surface of the optical film has a slope of between about 1 degree and 5 degrees.

In another aspect, the present description relates to an optical film that has a structured surface. The film has an optical clarity of between about 75% and 95% and an optical haze of between about 0 and 1%. The optical film has a plurality of particles with an average size less than about 0.5 microns.

In another aspect, the present description relates to an optical film with a structured surface. The film has an optical clarity of between about 35% and 70% and an optical haze of between about 1% and 4%.

In another aspect, the present description relates to an optical film that has a structured surface. The film has an optical clarity of between about 30% and 55% and an optical haze of between about 4 and 10%. The optical film has a plurality of particles with an average size less than about 0.5 microns.

In another aspect, the present description relates to an optical film that has a structured surface. The film has an optical clarity of between about 25% and 45% and an optical haze of between about 10 and 18%. The optical film has a plurality of particles with an average size less than about 0.5 microns.

In another aspect, the present description relates to a backlight for illuminating a display. The backlight has a light source, a first optical film for a receiving light from the light source, and a second optical film with a plurality of microstructures. The first optical film is disposed on and optically coupled to the second optical film. The second film has an optical clarity of less than about 85% and an optical haze of less than about 3.5%.

In a further aspect, the present description relates to an optical film with a structured surface. The clarity of the surface is less than ((−3×Optical Haze)+80%). The clarity may be greater than 20%.

In a final aspect, the present description relates to a method of making a film having a matte finish. The method includes providing a coated substrate with a coatable material disposed on the substrate, the coatable material providing a first major surface of the coated substrate. The method further includes changing the viscosity of the coatable material from the initial viscosity to a second viscosity. The coated substrate is passed through a first roller to remove any debris. The first major surface of the coated substrate is contacted by at least one face-side roller to impart a matte finish. Optionally, the coatable material is hardened to provide the film.

BRIEF DESCRIPTION OF THE DRAWINGS

The description may be more completely understood and appreciated in consideration of the following detailed description of various embodiments of the description in connection with the accompanying drawings, in which:

FIG. 26 is a scanning electron microscope (SEM) image of a film according to the present description.

FIG. 27 is a 2-dimensional Fourier spectrum of a film according to the present description.

DETAILED DESCRIPTION

This description generally relates to optical films that are capable of substantially enhancing brightness in a display system while at the same time masking and/or eliminating physical defects such as scratches, and undesirable optical effects such as moiré and color mura. The disclosed optical films eliminate, or reduce, the need for one or more conventional films, such as one or more diffuser films, in the display. The disclosed optical films include a plurality of randomly distributed microstructures for improving brightness and a matte surface for improving the display cosmetics. The matte surface masks, eliminates, and/or reduces the visibility of physical defects, moiré, color mura and substantially eliminates or reduces scratching of a film that comes into physical contact with the structured surface. The optical haze of the structured surface is in a range that substantially maintains brightness, and the optical clarity of the structured surface is in a range that substantially masks and/or eliminates defects.

The present description relates to films that have a plurality of randomly oriented structured on their surfaces. The structures in question have very small slope and the films can be manufactured at low cost. The films presented may have a vast number of optical haze and clarity values. The values may be determined for specific haze and clarity values, in order to enhance performance of an optical system as desired.

Figure 1:
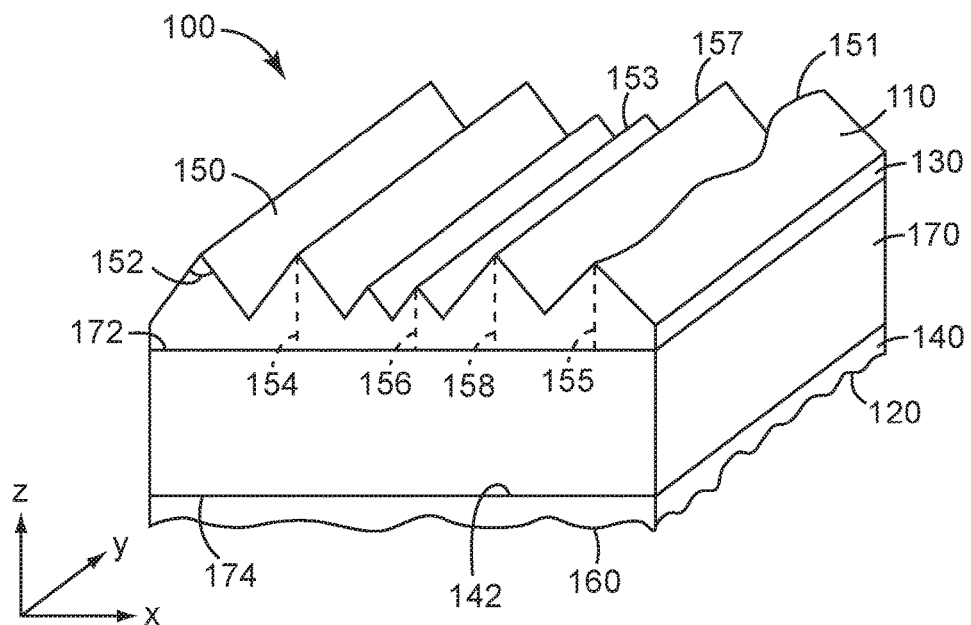
FIG. 1 is a schematic side-view of a light redirecting film.

FIG. 1 is a schematic side-view of a light redirecting film 100 for redirecting an incident light toward a desired direction. Light redirecting film 100 includes a first structured surface 110 that includes a plurality of microstructures 150 that extend along the y-direction. Light redirecting film 100 also includes a second structured surface 120 that is opposite the first structured surface 110 and includes a plurality of microstructures 160.

Light redirecting film 100 also includes a substrate layer 170 that is disposed between respective first and second structured surfaces 110 and 120 and includes a first major surface 172 and an opposing second major surface 174. Light redirecting film 100 also includes a prism layer 130 that is disposed on first major surface 172 of the substrate layer and includes first structured surface 110 of the light redirecting film, and a structured layer 140 with a major surface 142 that is disposed on second major surface 174 of the substrate layer and includes structured surface 120 of the light redirecting film.

The exemplary light redirecting film 100 includes three layers 130, 170 and 140. In general, the light redirecting film can have one or more layers. For example, in some cases, the light redirecting film can have a single layer that includes respective first and second major surfaces 110 and 120. As another example, in some cases, the light redirecting film can have many layers. For example, in such cases, substrate 170 can have multiple layers. It may also be understood that the various layers of the film can be understood as being separate films. Therefore, structure 100 may be understood as a film stack. In such an embodiment, prismatic structured layer 130 may be understood as a first optical film. Similarly, structured layer 140 may be understood as a second optical film disposed on and optically coupled to the first optical film.

Microstructures 150 are primarily designed to redirect light that is incident on major surface 120 of the light redirecting film, along a desired direction, such as along the positive z-direction. In the exemplary light redirecting film 100, microstructures 150 are prismatic linear structures. In general, microstructures 150 can be any type microstructures that are capable of redirecting light by, for example, refracting a portion of an incident light and recycling a different portion of the incident light. For example, the cross-sectional profiles of microstructures 150 can be or include curved and/or piece-wise linear portions. For example, in some cases, microstructures 150 can be linear cylindrical lenses extending along the y-direction.

Each linear prismatic microstructure 150 includes an apex angle 152 and a height 154 measured from a common reference plane such as, for example, major plane surface 172. In some cases, such as when it is desirable to reduce optical coupling or wet-out and/or improve durability of the light redirecting film, the height of a prismatic microstructure 150 can change along the y-direction. For example, the prism height of prismatic linear microstructure 151 varies along the y-direction. In such cases, prismatic microstructure 151 has a local height that varies along the y-direction, a maximum height 155, and an average height. In some cases, a prismatic linear microstructure, such as linear microstructure 153, has a constant height along the y-direction. In such cases, the microstructure has a constant local height that is equal to the maximum height and the average height.

In some cases, such as when it is desirable to reduce optical coupling or wet-out, some of the linear microstructures are shorter and some of the linear microstructures are taller. For example, height 156 of linear microstructure 153 is smaller than height 158 of linear microstructure 157. Alternatively, the microstructures 160 on the surface of matte layer 140 may also be varied in height for reduction of optical coupling or wet-out.

Apex or dihedral angle 152 can have any value that may be desirable in an application. For example, in some cases, apex angle 152 can be in a range from about 70 degrees to about 110 degrees, or from about 80 degrees to about 100 degrees, or from about 85 degrees to about 95 degrees. In some cases, microstructures 150 have equal apex angles which can, for example, be in a range from about 88 or 89 degree to about 92 or 91 degrees, or can be about 90 degrees.

Prism layer 130 can have any index of refraction that may be desirable in an application. For example, in some cases, the index of refraction of the prism layer is in a range from about 1.4 to about 1.8, or from about 1.5 to about 1.8, or from about 1.5 to about 1.7. In some cases, the index of refraction of the prism layer is not less than about 1.5, or not less than about 1.55, or not less than about 1.6, or not less than about 1.65, or not less than about 1.7.

In some cases, such as when light redirecting film 100 is used in a liquid crystal display system, the light redirecting film 100 can increase or improve the brightness of the display. In such cases, the light redirecting film has an effective transmission (ET) or relative gain that is greater than 1. As used herein, "effective transmission" is the ratio of the luminance of the display system with the film in place in the display system to the luminance of the display without the film in place.

Figure 2:
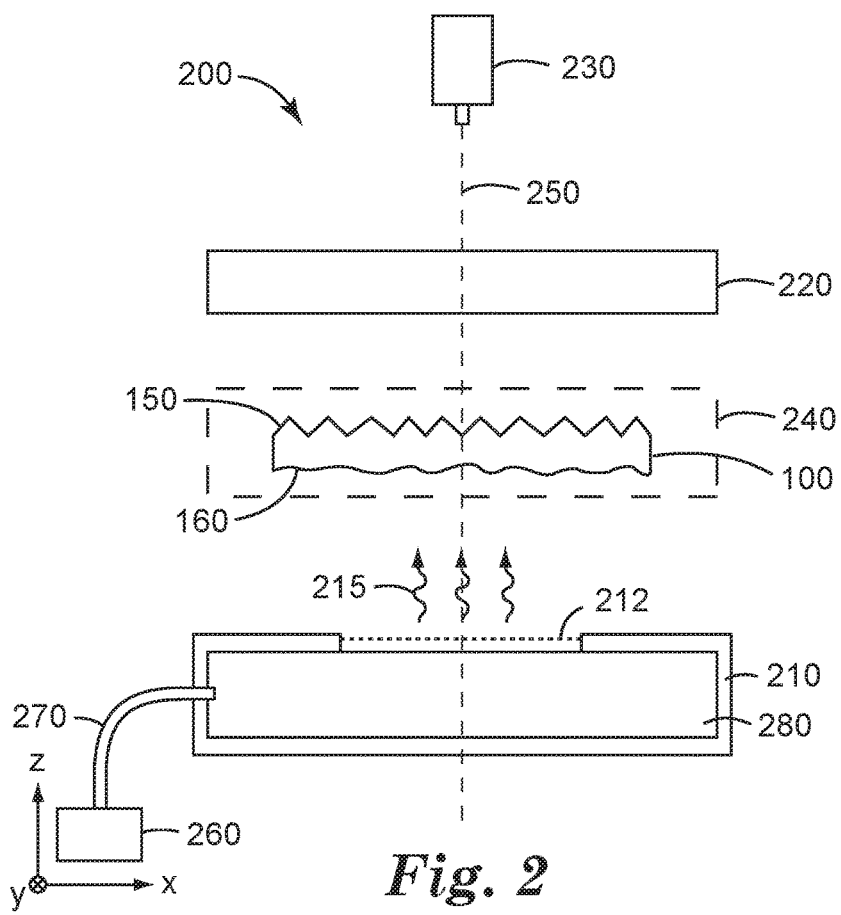
FIG. 2 is a schematic side-view of an optical system for measuring effective transmission.

Effective transmission can be measured using an optical system 200, a schematic side-view of which is shown in FIG. 2. Optical system 200 is centered on an optical axis 250 and includes a hollow lambertian light box 210 that emits lambertian light 215 through an emitting or exit surface 212, a linear light absorbing polarizer 220, and a photo detector 230. Light box 210 is illuminated by a stabilized broadband light source 260 that is connected to an interior 280 of the light box via an optical fiber 270. A test sample of the ET, which is to be measured by the optical system, is placed at location 240 between the light box and the absorbing linear polarizer.

The ET of light redirecting film 100 can be measured by placing the light redirecting film at location 240 with linear prisms 150 facing the photo detector and microstructures 160 facing the light box. Next, the spectrally weighted axial luminance $I_1$ (luminance along optical axis 250) is measured through the linear absorbing polarizer by the photo detector. Next, the light redirecting film is removed and the spectrally weighted luminance $I_2$ is measured without the light redirecting film placed at location 240. ET is the ratio $I_1/I_2$. ET0 is the effective transmission when linear prisms 150 extend along a direction that is parallel to the polarizing axis of linear absorbing polarizer 220, and ET90 is the effective transmission when linear prisms 150 extend along a direction that is perpendicular to the polarizing axis of the linear absorbing polarizer. The average effective transmission (ETA) is the average of ET0 and ET90.

Measured effective transmission values disclosed herein were measured using a SpectraScan™ PR-650 SpectraColorimeter (available from Photo Research, Inc, Chatsworth, Calif.) for photo detector 230. Light box 210 was a Teflon cube with a total reflectance of about 85%.

In some cases, such as when light redirecting film 100 is used in a display system to increase the brightness and the linear prisms have an index of refraction that is greater than about 1.6, the average effective transmission (ETA) of the light redirecting film is not less than about 1.5, or not less than about 1.55, or not less than about 1.6, or not less than about 1.65, or not less than about 1.7, or not less than about 1.75, or not less than about 1.8.

In some cases, the average effective transmission of the optical film or optical stack is less by no more than about 2% or less than about 1% or less than about 0.5% than an optical film or optical stack that has the comparable construction except for a smooth non-structured second surface rather than a microstructured second surface. As used herein, "comparable construction" is actually the same construction in all respects except for the noted exception (e.g. here, a smooth non-structured second surface rather than a microstructured second surface). In some cases, the average effective transmission of the optical film or optical stack is greater than an optical film or optical stack that has the same construction except for a smooth non-structured second surface rather than a microstructured second surface. In some embodiments, the average effective transmission of the microstructured surface is at least 0.5% or at least 1.0% or at least 1.5% greater than a comparable stack with a smooth second surface.

Optical haze, as used herein, is defined as the ratio of the transmitted light that deviates from the normal direction by more than 2.5 degrees to the total transmitted light. Haze values disclosed herein were measured using a Haze-Gard Plus haze meter (available from BYK-Gardiner, Silver Springs, Md.) according to the procedure described in ASTM D1003. Optical clarity, as used herein, refers to the ratio $(T_1-T_2)/(T_1+T_2)$, where $T_1$ is the transmitted light that deviates from the normal direction between 1.6 and 2 degrees from the normal direction, and $T_2$ is the transmitted light that lies between zero and 0.7 degrees from the normal direction. Clarity values disclosed herein were measured using a Haze-Gard Plus haze meter from BYK-Gardiner.

Microstructures 160 on the optical structured surface primarily serve to hide undesirable physical defects (such as, for example, scratches) and/or optical defects (such as, for example, undesirably bright or "hot" spots from a lamp in a display or illumination system) with no, or very little, adverse effect on the capabilities of the light redirecting film to redirect light and enhance brightness. In some cases, the structured surface comprising microstructures 160 has an optical haze of less than about 20%, or less than about 10%, or less than about 7.5%, or less than about 5% or less than about 3.5%, or less than about 3%, or less than about 2%, or less than about 1.5%, or less than about 1%. In some cases, the surface has an optical haze of between about 0 and 1%, or an optical haze of between about 4% and 10%, or an optical haze of between about 10% and 18%.

In some cases, the structured surface comprising microstructures 160 has an optical clarity of less than about 90%, or less than about 80%, or less than about 75%, or less than about 70%, or less than about 65%, or less than about 60%, or less than about 55%, or less than about 50%, or less than about 45%, or less than about 40%. In some cases, the surface has an optical clarity of between about 75% and 95%, or between about 35% and 70%, or between about 30% and 55%, or between about 25% and 45%. In some cases, the optical clarity of the structured surface is less than the function: (−3×OpticalHaze)+80%. The optical clarity of the structure may also be less than the function (−3× OpticalHaze)+80% and greater than 20%.

A high amount of the disclosed optical haze values and optical clarity values of the optical surface should be understood as being capable of being properties of a given film displayed with one another, that is, should be understood as being capable of independent control. For example, a given structured surface may have an optical clarity of less than 90% and an optical haze of less than 10%, or an optical clarity of less than 90% and an optical haze of less than 5%. Further a given structured surface may have an optical haze of less than 5% and an optical clarity of less than 70%.

Figure 15:
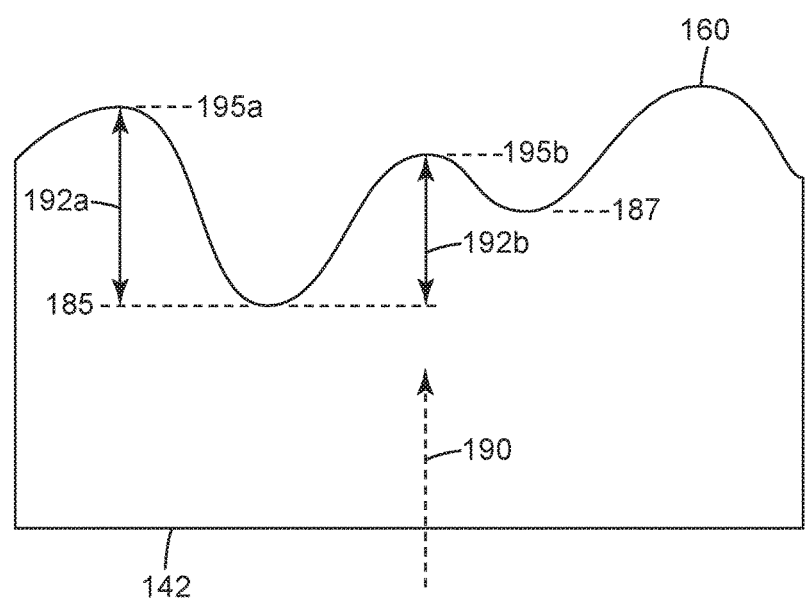
FIG. 15 is a schematic side view of a portion of a light redirecting film.

Height of microstructures may be better understood by reference to FIG. 15. In general, microstructures 160 can have any height and any height distribution. Height itself may be defined as the distance (e.g. 192*a*, 192*b*) along a plane 190 orthogonal to the base of the material 142 from the lowest local minimum of the surface 185 in the area to an adjacent peak of the microstructure array (local maximum) 195*a* or 195*b*. Height is not measured from a local minimum that is not the lowest local minimum in the area, e.g. 187. Given the multiple heights of peaks on the surface, an average height may be determined (where average height equals the total height of all peaks divided by number of peaks, e.g. (192*a*+192*b*)/2). In some cases, the average height of microstructures 160 is not greater than about 10 µm, or not greater than about 7.5 µm, or not greater than about 5 µm, or not greater than about 2.5 µm.

Figure 18:
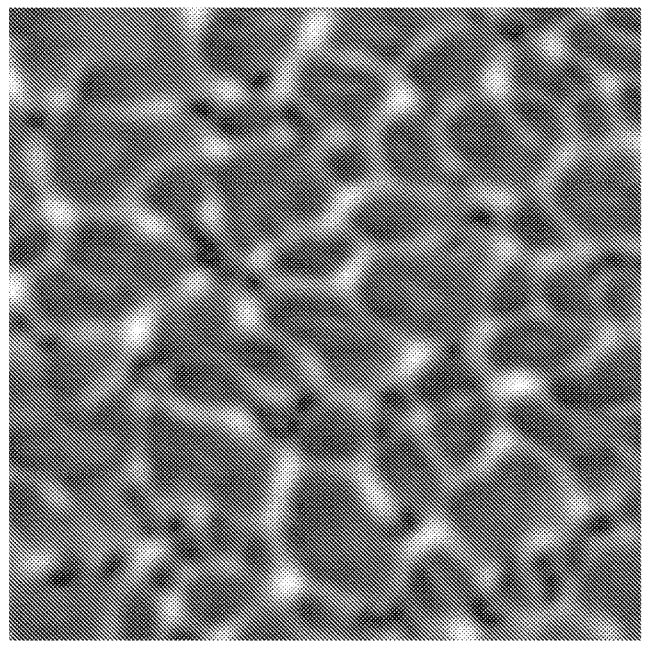
FIG. 18 is a topographic map image of a film of the surface of a film according to the present description.
Figure 19:
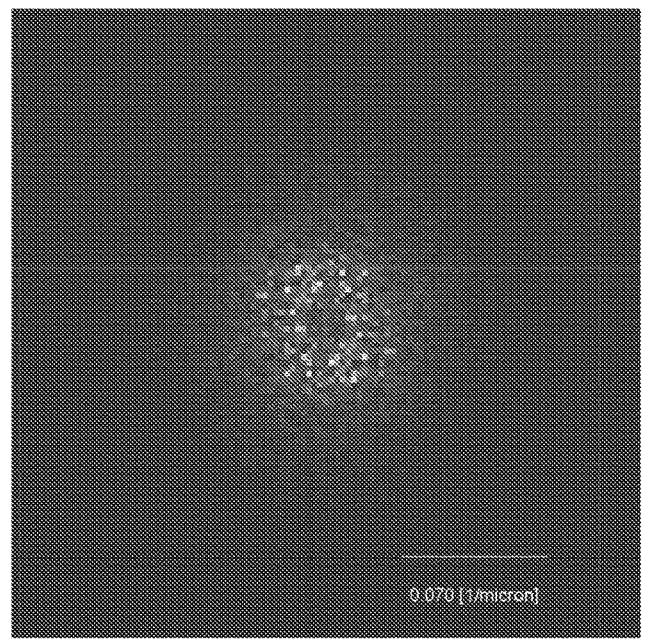
FIG. 19 is a 2-dimensional Fourier spectrum of a film according to the present description.
Figure 20:
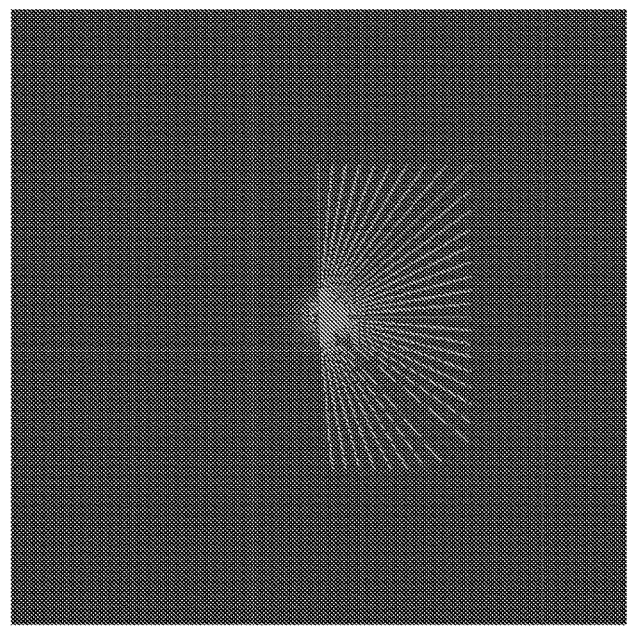
FIG. 20 is a line profile map taken through a Fourier spectrum.

As noted, the presently described matte films may also be understood as having microstructures that are randomly positioned across the surface of the film. Such randomization is important for mitigating the occurrence of Moiré interference patterns that result from periodic structures. One valuable way to measure the randomness of a surface is by creating a Fourier spectrum of the surface values. The process for measuring Fourier spectrum and deriving a randomness measurement may be understood by reference to FIGS. 18-24. FIG. 18 illustrates a topographic map of a film according to the present description. The topographic data (i.e. height values) may be imported into a sophisticated calculation and manipulation program, such as Matlab. From this, the Fourier spectrum can be calculated, and a 2-dimensional spectrum, such as that shown in FIG. 19 may be created. The spectrum of FIG. 27 is actually one taken from an Example illustrated below. The line profile through the 2-dimensional spectrum may then be determined in a series of directions, as illustrated in FIG. 20. Only half of the spectrum must be investigated due to the symmetry of the spectrum.

Figure 21:
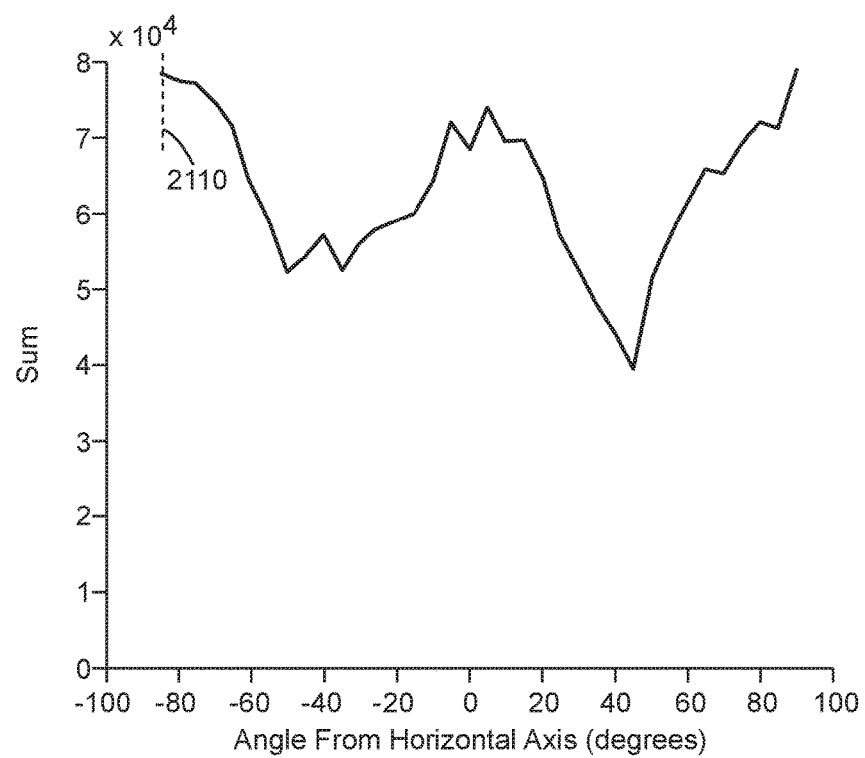
FIG. 21 is a normalized sum of line profiles through a Fourier spectrum.
Figure 22:
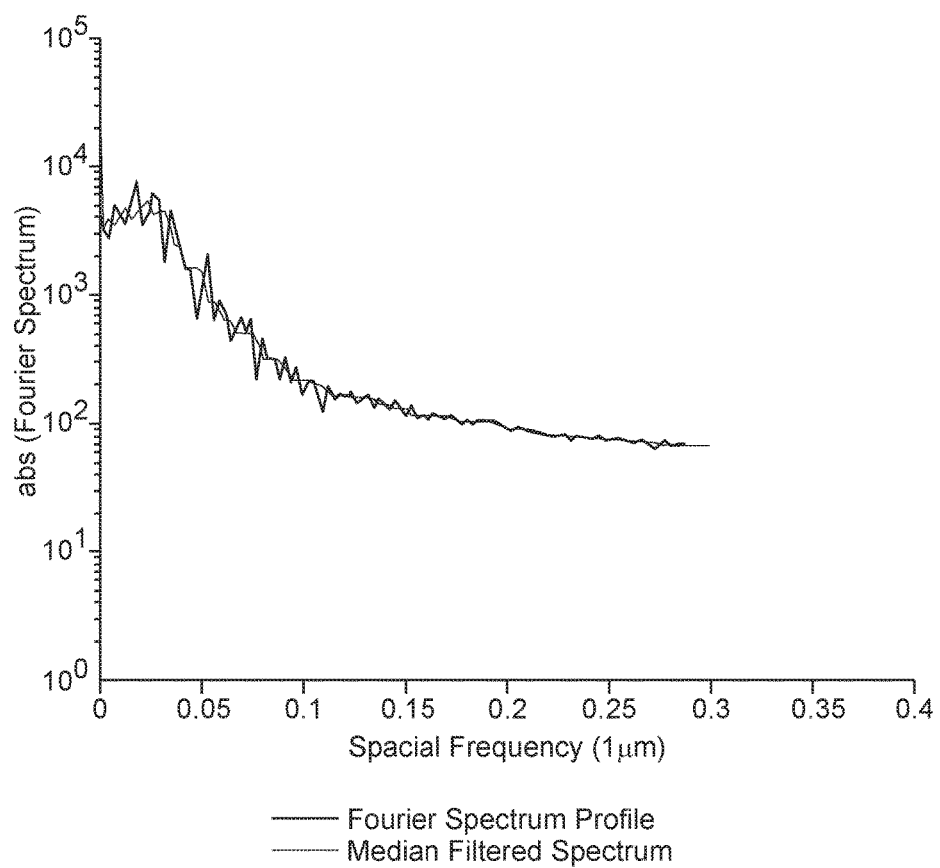
FIG. 22 is a peak profile of a Fourier spectrum.
Figure 23:
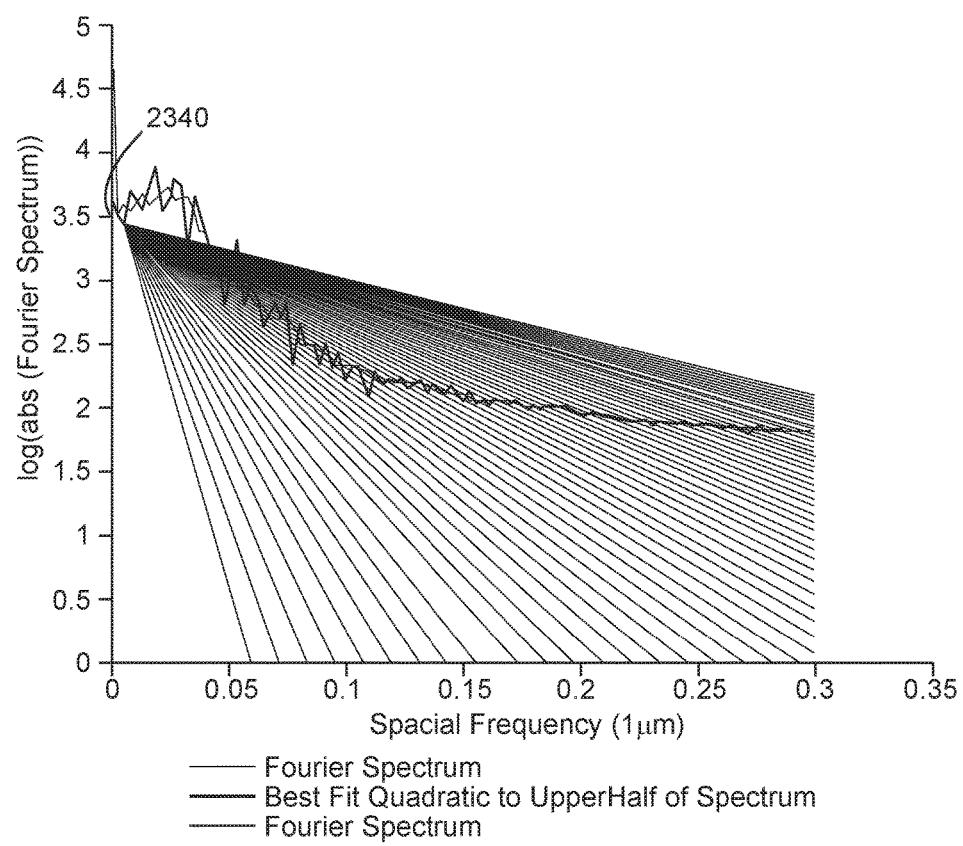
FIG. 23 is a peak profile of a Fourier spectrum with search lines.
Figure 24A:
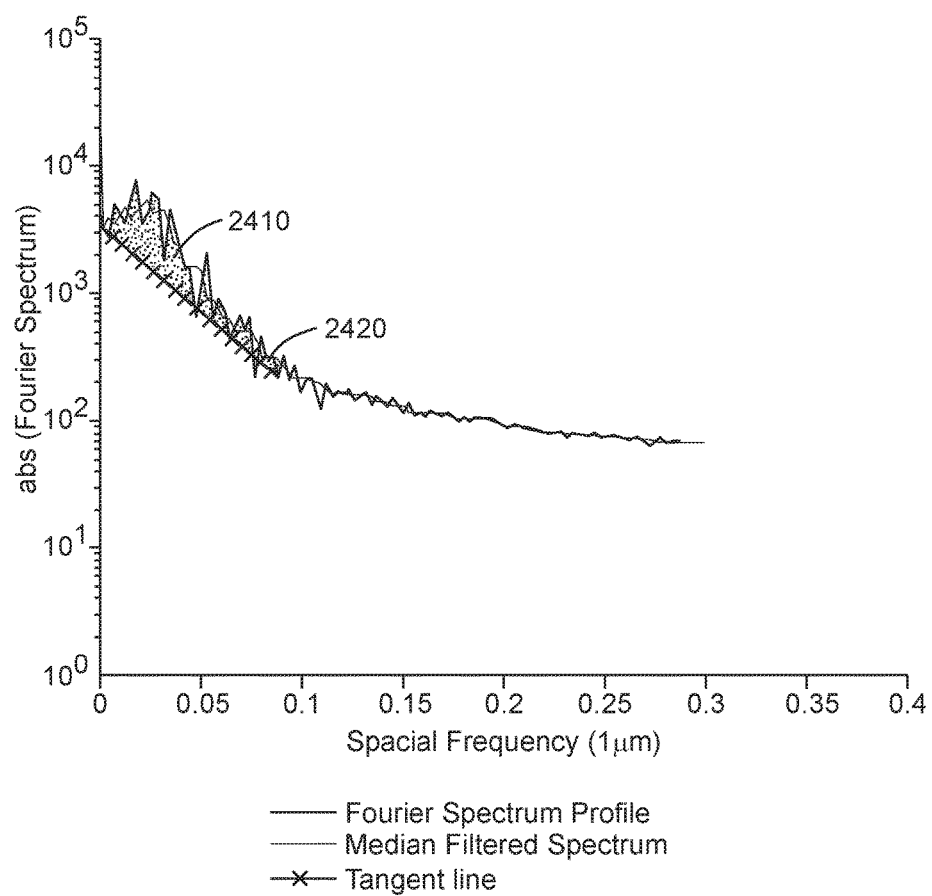
FIGS. 24A and B are peak profiles of a Fourier spectrum showing ratio areas for $RR_1$ calculation.
Figure 24B:
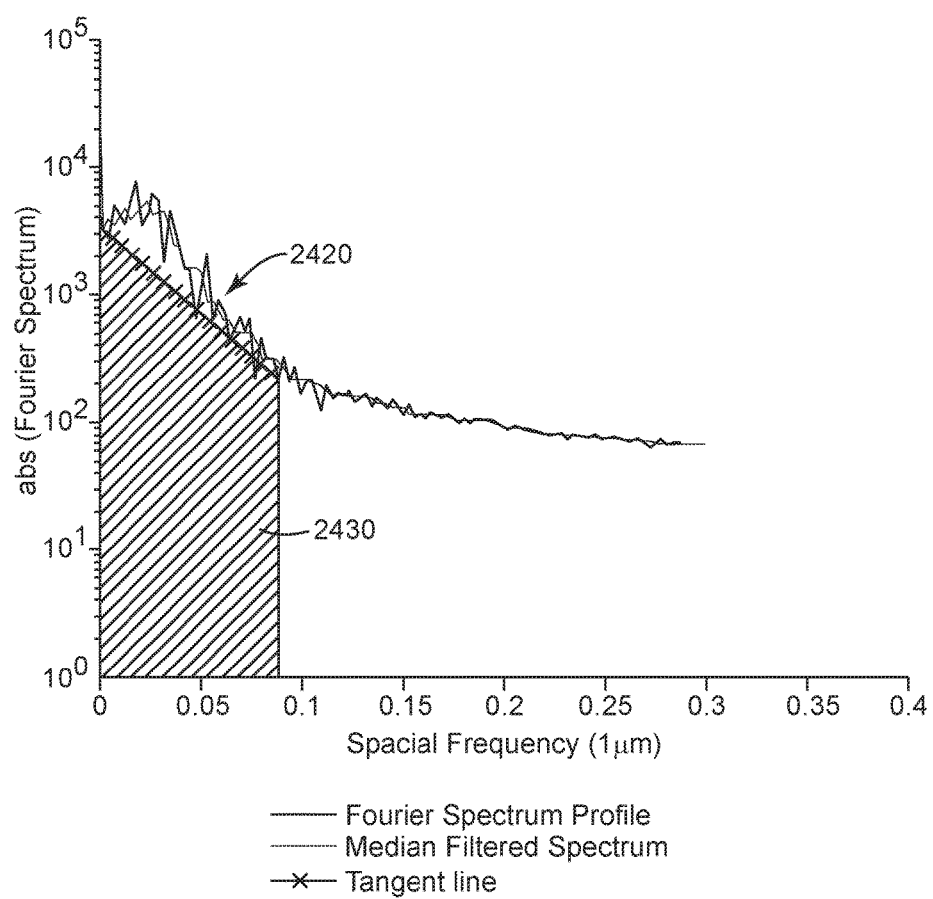

The total signal in each line profile is calculated, normalized by the length of the profile, and possibly by unequal frequency steps in the fx and fy directions, as shown in FIG. 21. The maximum line profile 2110 is selected from this normalized sum. Next, a Fourier spectrum line profile (in the direction of maximum signal) is plotted. The spectrum is median filtered to remove the effect of spikes on the steps below. The Fourier spectrum is shown in FIG. 22. The median filtered spectrum is also illustrated. At this point, the user selects a point at or near the minimum just to the left of the peak in the spectrum and a local minimum is found. From this local minimum 2340, as illustrated in FIG. 23, a series of test lines segments are drawn for visualization from the local minimum 2340 to below the spectrum, and for each point on each line segment the distance between the spectrum and test line segment is calculated and the sum of distances for the closest 50% of points is calculated. These values are normalized by the lengths of the search lines.

The minimum in the resulting curve corresponds to the test line that is closest to the spectrum. This line is considered tangent to the spectrum. The tangent line is applied to the graph in FIGS. 24A and 24B. A search is performed along this tangent line for the portion that is closest to the spectrum. This position is the tangent position 2420. The local minimum to the left of the peak and the tangent position define the bounds of the peak, and the line between them defines a baseline. The ratio of the areas between the peak and the tangent line (shaded area 2410 in FIG. 24A) and under the tangent line (shaded area 2430 in FIG. 24B) is used to specify the strength of the periodicity of topography. These areas are calculated in linear (not $\log_{10}$) units. For purposes of this disclosure, the ratio of the area between the peak and tangent line to the area under the tangent line may be referred to as $RR_1$.

Figure 25:
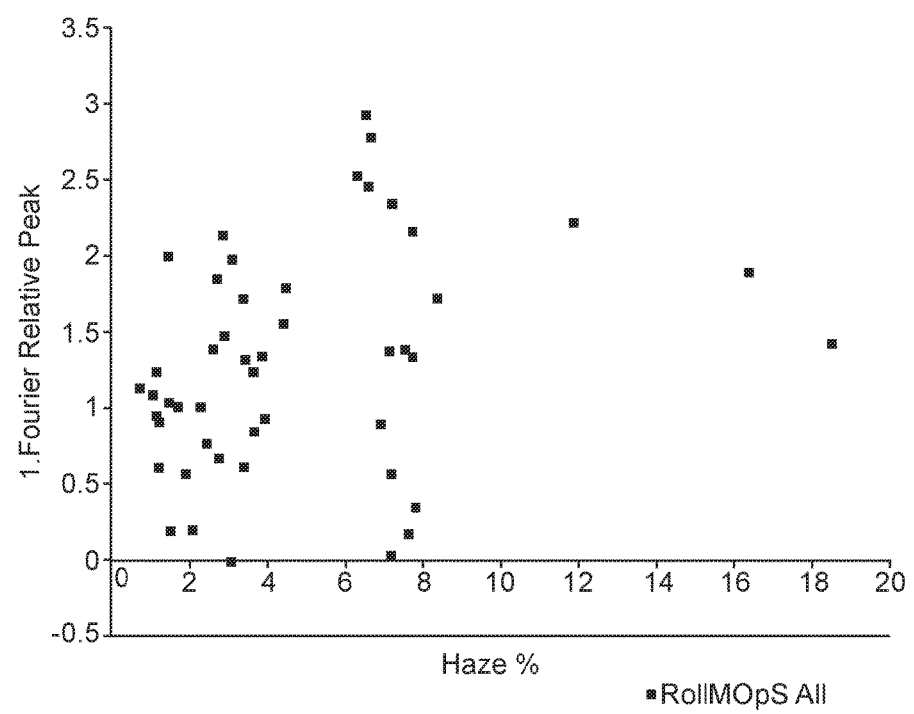
FIG. 25 is a graph of haze percentage versus Fourier $RR_1$ values of films according to the present description.

Plots of a number of different $RR_1$ values of matte films according to the present description are illustrated in FIG. 25. In this graph, $RR_1$ values are displayed versus the haze value of a given film. In some embodiments, the $RR_1$ value is less than 2. In some embodiments the $RR_1$ value is less than 1. In some embodiments, the $RR_1$ value may even be less than 0.5. Each of these values may be understood as corresponding to a strongly random arrangement (or non-periodic array). The lower the $RR_1$ value is, the less periodic the array of microstructures. This graph may be used to show the periodicity (or lack thereof) for at least some films of a given haze value disclosed herein. For example for a given film according to the present description with a haze less than about 20%, or less than about 10%, or less than about 7.5%, or less than about 5%, or less than about 3%, or less than about 1.5%, the film may have a $RR_1$ value is less than 2, or less than 1.

In a number of embodiments, it may be useful to include substrate layer 170. The substrate may be valuable not only for structural purposes, but also in the process of developing and shaping the microstructured surface. Microstructured surface may be created in accordance with the methods described in commonly owned U.S. Patent Application No. 2009/0029054, incorporated by reference herein in its entirety. Accordingly, substrate 170 may be any of a variety of materials suitable for use as a substrate, including flexible materials such as, for example, woven materials, knitted materials, films (e.g., polymeric films), nonwovens, metal sheet, metal foils, glass and the like. In some embodiments where the final film product is intended for use in optical applications such as in an optical display, the substrate material will be chosen based in part on the desired optical and mechanical properties for the intended use. Suitable light transmissive optical films include without limitation multilayer optical and brightness enhancing films (e.g. reflective or absorbing), polarizing films, diffusive films and compensator films. Mechanical properties can include flexibility, dimensional stability and impact resistance. In some embodiments, an optically clear material (e.g., transparent) may be desired. Examples of suitable optically clear materials include optically clear polyester film, triacetate (TAC) film, polyethylene naphthalate, polyethylene terephthalate (PET), polycarbonate, cellulose acetate, poly(methyl methacrylate), polyolefins such as biaxially oriented polypropylene (BOPP) and simultaneously biaxially-oriented polypropylene (S-BOPP). The substrate 170 may comprise or consist of polyamides, polyimides, phenolic resins, polystyrene, styrene-acrylonitrile copolymers, epoxies, and the like.

As noted, microstructured surface may be created in accordance with the methods described in commonly owned U.S. Patent Application No. 2009/0029054. As such, the structured surface may be formed by a process that begins with an initial coating on the substrate. The coating has its viscosity changed from a first viscosity to a second viscosity. The viscosity change may be understood as transitioning from a first viscosity, which is more liquid-like and capable of coating, to a second viscosity, which is more solid and therefore capable of retaining a structure, at least temporarily. After viscosity change, the coating comes into contact with a face-side roller that imparts a microstructured finish on it. The coating may then optionally be hardened. Accordingly, the substrate used may be a substrate capable of hardening. This process may be better understood by reference to FIG. 3. According to this embodiment, the microstructured surface will then have certain desirable material properties. Microstructured matte films produced according to this structure may be described as roll-induced matte optical structures.

Figure 3:
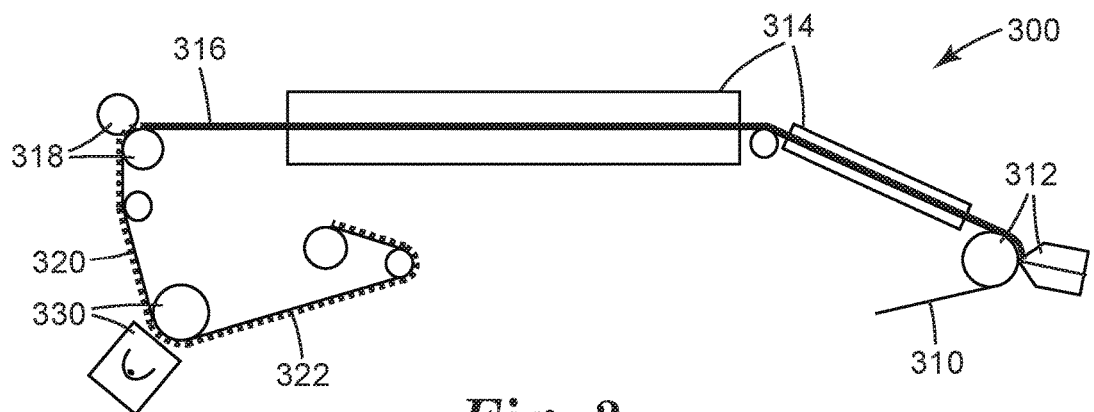
FIG. 3 is an illustration of a system used to create a film according to the present description.
Figure 4:
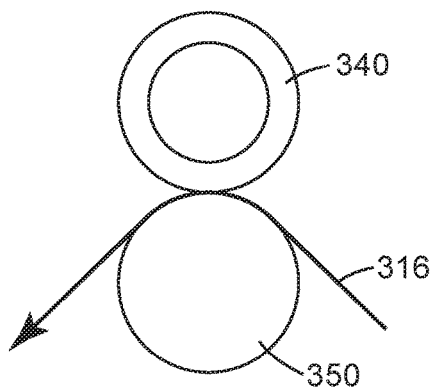
FIG. 4 is a close-up view of a portion of a system used to create a film according to the present description.

The apparatus for structuring the film is displayed as an apparatus 300 shown schematically in FIG. 3. As the figure illustrates, in at least one embodiment, a coating is applied to a substrate 310 by a coating applicator 312. The viscosity of the coating, which may generally be initially in a liquid state, is adjusted at a thickening station 314. This viscosity change (from a first viscosity to a second viscosity) may occur by removing volatile solvent from a resin solution, cooling a 100% solids resin, partial cross-linking a resin, warming a very high viscosity resin, combining two or more of these techniques, or other methods. After the viscosity change, the coated layer 316 is finished. This may generally be accomplished by rolling the substrate and coating through a transformation station 318 that is generally a roller or nip. A close-up view of such a nip is illustrated in FIG. 4. The nip has a face side roller 340 and a back-up roll 350 that the film 316 is rolled through. A first major surface of the coated substrate comes into contact with the face-side roller. Part of the coating layer is pulled away with the nip forming the remainder into a microstructured surface. The patterned coating 320 leaves the transformation station in a potentially less than solid state. Therefore, as illustrated in FIG. 3, it is sent through a solidification station 330. Solidification may be performed by any number of suitable methods, including UV curing, thermal curing, electron beam curing, epoxy curing, further solvent removal, or others. The solidification station step results in a film with the pattern locked into place 322.

Figure 5:
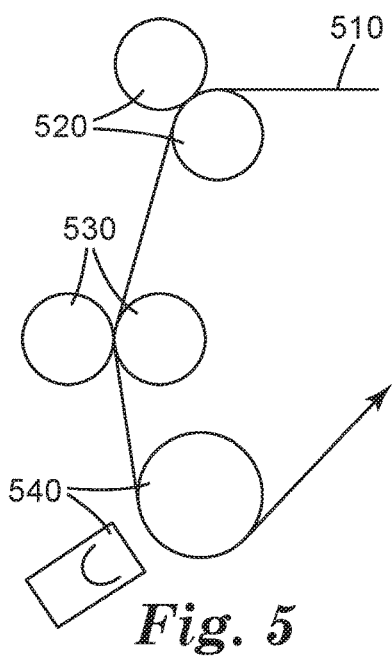
FIG. 5 is a close-up view of a portion of a system used to create a film according to the present description.

In certain embodiments, a decoy nip may be added into the process that has been illustrated in FIG. 3. Such a construction is illustrated in FIG. 5. In this embodiment the film 510 is first passed through a decoy nip 520, before entering the transformation station nip 530. This construction may be desirable in situation where large dirt particles are arriving at the transformation station nip. In such a situation, the addition of the decoy nip may remove and collect dirt prior to structuring and transformation. The structure of the surface is again locked into place at a solidification station 540.

The decoy nip, as noted, is used to collect and remove defect causing debris and particles, such as dirt, from a liquid coating. The device is useful for improving the robustness of the structuring process in low cleanliness environments. The decoy nip has equal or higher affinity for particulates than the transformation station nip. The decoy nip removes debris from the liquid coating that would otherwise be captured on the transformation station nip without adversely affecting the final structured coating produced. The distance from the decoy roll nip to the transformation station roll nip can vary based upon the cleanliness of the manufacturing environment.

Coatable materials suitable for use in the present description may comprise any of a variety of film forming materials. In some embodiments, the coatable material is a polymeric material comprised of one or more polymers and/or oligomers in solvent. In some embodiments, the coatable material is a mixture of one or more monomers, oligomers and/or polymers in one or more solvents. In other embodiments, the coatable material includes the foregoing oligomer(s), monomer(s) and/or polymer(s) in one or more solvents along with a volume of particles or nanoparticles. In certain embodiments the coatable materials may include photo initiators, cross-linkers, anti-static compounds, and other active materials.

Nanoparticles can be surface modified which refers to the fact that the nanoparticles have a modified surface so that, for example, the nanoparticles provide a stable dispersion. "Stable dispersion" refers to a dispersion in which the colloidal nanoparticles do not agglomerate after standing for a period of time, such as about 24 hours, under ambient conditions, e.g., room temperature (about 20-22° C.), and atmospheric pressure, without extreme electromagnetic forces.

Surface-modified colloidal nanoparticles can optionally be present in a polymer coating used as a coatable composition herein with nanoparticles present in an amount effective to enhance the durability of the finished or optical element. The surface-modified colloidal nanoparticles described herein can have a variety of desirable attributes, including, for example, nanoparticle compatibility with a coatable composition such that the nanoparticles form stable dispersions within the coatable composition, reactivity of the nanoparticle with the coatable composition making the composite more durable, and a low impact or uncured composition viscosity. A combination of surface modifications can be used to manipulate the uncured and cured properties of the composition. Surface-modified nanoparticles can improve optical and physical properties of the coatable composition such as, for example, improved resin mechanical strength, minimized viscosity changes while increasing solids volume loading in the coatable composition and maintain optical clarity while increasing solid volume loading in the coatable composition.

In some embodiments, the nanoparticles are surface-modified nanoparticles. Suitable surface-modified colloidal nanoparticles can comprise oxide particles. Nanoparticles may comprise a range of particle sizes over a known particle size distribution for a given material. In some embodiments, the average particle size may be within a range from about 1 nm to about 100 nm. Particle sizes and particle size distributions may be determined in a known manner including, for example, by transmission electron microscopy (TEM). Suitable nanoparticles can comprise any of a variety of materials such as metal oxides selected from alumina, tin oxide, antimony oxide, silica, zirconia, titania and combinations of two or more of the foregoing. Surface-modified colloidal nanoparticles can be substantially fully condensed.

In some embodiments, silica nanoparticles can have a particle size ranging from about 5 to about 75 nm. In some embodiments, silica nanoparticles can have a particle size ranging from about 10 to about 30 nm. Silica nanoparticles can be present in the coatable composition in an amount from about 10 to about 100 phr. In some embodiments, silica nanoparticles can be present in the coatable composition in an amount from about 25 to about 80 phr, and in other embodiments, silica nanoparticles can be present in the coatable composition in an amount from about 30 to about 70 phr. Silica nanoparticles suitable for use in the coatable compositions of the present description are commercially available from Nalco Chemical Co. (Naperville, Ill.) under the product designation NALCO COLLOIDAL SILICAS. Suitable silica products include NALCO products 1040, 1042, 1050, 1060, 2327 and 2329. Suitable fumed silica products include for example, products sold under the trade name AEROSIL series OX-50, -130, -150, and -200 available from DeGussa AG, (Hanau, Germany), and CAB-O-SPERSE 2095, CAB-O-SPERSE A105, CAB-O-SIL MS available from Cabot Corp. (Tuscola, Ill.) Surface-treating the nanosized particles can provide a stable dispersion in the coatable composition (e.g., a polymeric resin). Preferably, the surface-treatment stabilizes the nanoparticles so that the particles will be well dispersed in the coatable composition and results in a substantially homogeneous composition. Furthermore, the nanoparticles can be modified over at least a portion of its surface with a surface treatment agent so that the stabilized particle can copolymerize or react with the coatable composition during curing.

Figure 6:
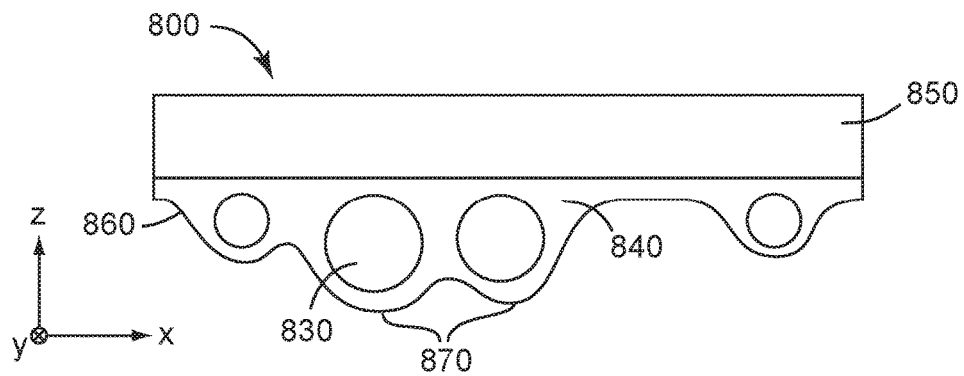
FIG. 6 is a schematic side-view of a light redirecting film.
Figure 7:
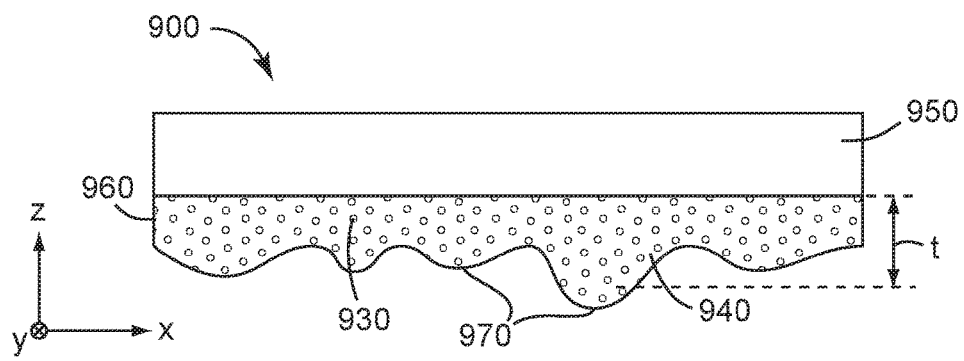
FIG. 7 is a schematic side-view of another light redirecting film.

A number of matte films include sufficiently large particles that the particles serve as the primary reason for formation of microstructures. Such a film is illustrated in FIG. 6. In such an embodiment the optical film 800 possesses substrate or first film 850 mechanically coupled to microstructured layer 860. In this embodiment, particles 830 are dispersed in a binder 840. It may be noted that size of the particles 830 is very close in scale to the actually width or height of the microstructures 870. The current description provides for a structured surface 160 that has particles. However, the particles of the current description are small in relation to the thickness of the coating layer and thus do not serve as the primary reason for formation of the microstructures. Optical properties such as haze, clarity and transmission of matte coatings are controlled in part by the size of particles relative to the coating thickness, as well as the density and distribution of such particles. An example of a film designed according to the current description is illustrated in FIG. 7. Here optical film or film stack 900 possesses substrate layer or first film 950 mechanically coupled to microstructured layer 960. Particles 930 are dispersed in a binder 940. It is readily apparent that the thickness of the layer at all points, and most especially at peaks of the microstructures 970 is much greater than the thickness of the particles 930. More specifically, the particles in the optical film have a size of less than 0.5 microns, or in some embodiments, less than 0.2 microns, or less than 0.1 microns.

In some embodiments, the structured surface will have an index of refraction of between about 1.50 and 1.70. In other embodiments the structured surface may have an index of refraction from as low as about 1.17 to as high as about 1.8.

Figure 8:
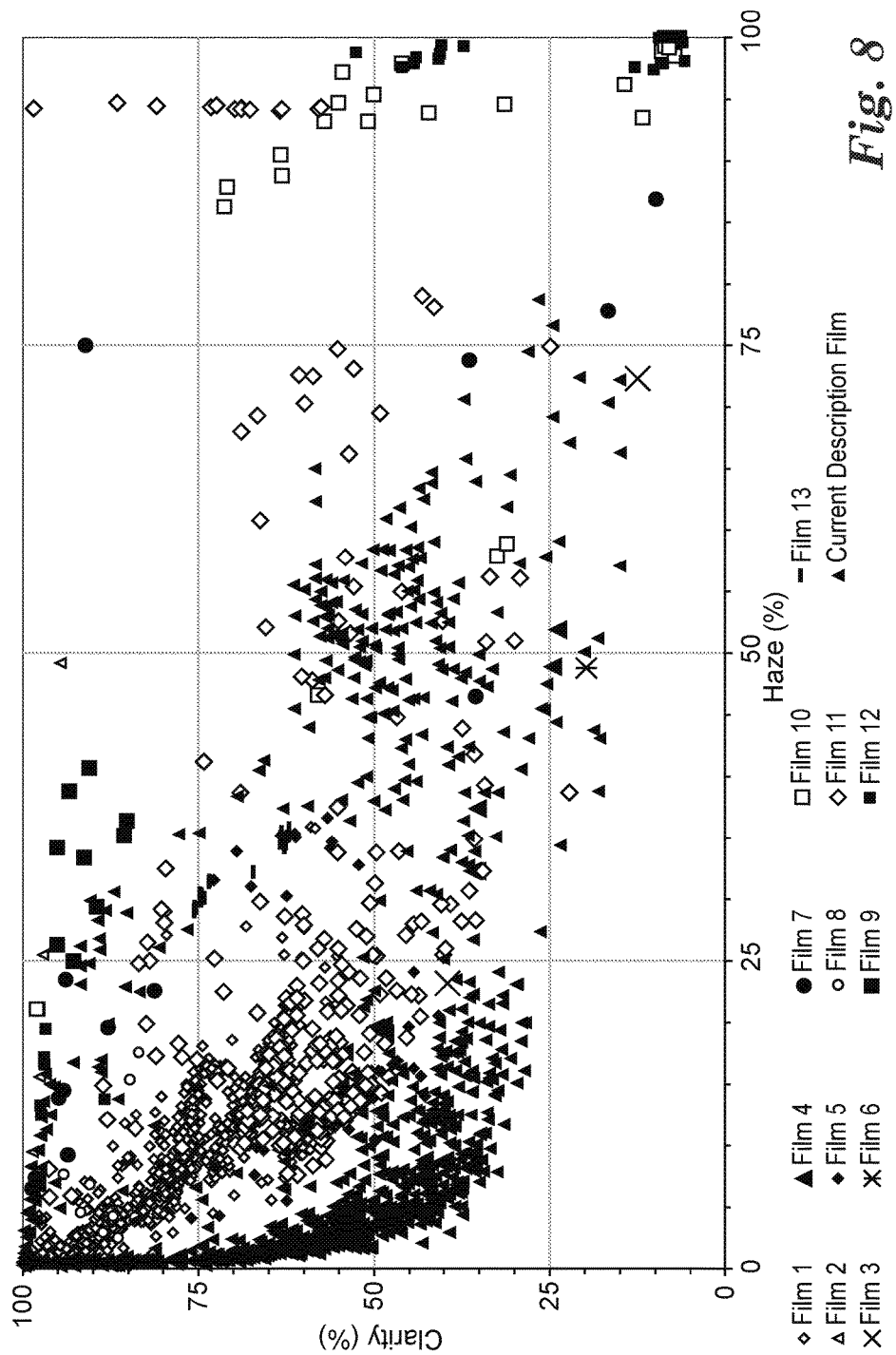
FIG. 8 is a map of haze and clarity values of a plurality of microstructured films.
Figure 9:
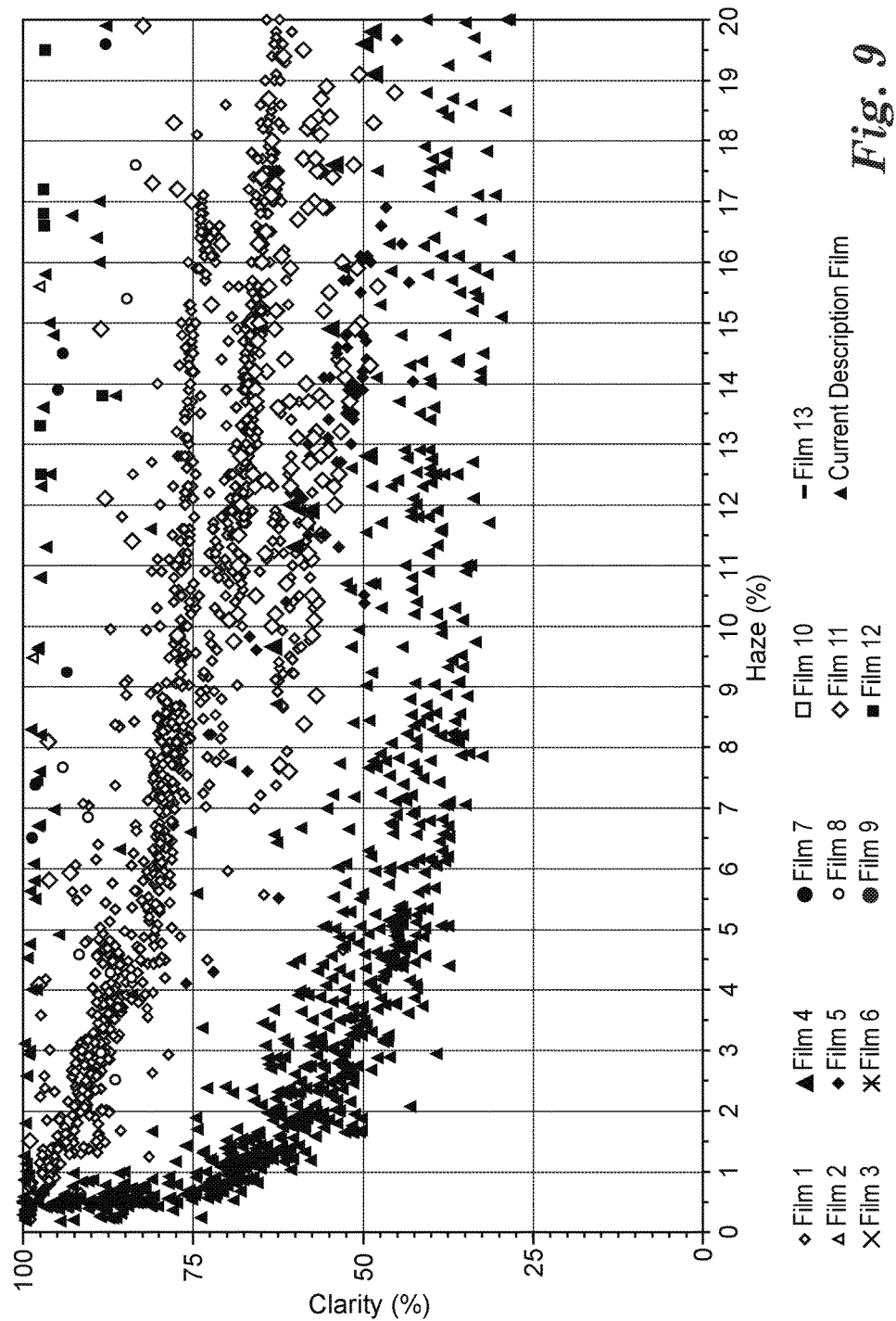
FIG. 9 is a close-up view of a map of haze and clarity values of a plurality of microstructured films.

A better understanding of the haze and clarity performance may be understood by reference to FIGS. 8 and 9. FIG. 8 provides a full haze and clarity spectrum of a number of films developed according to the present description. It is illustrated in comparison to thirteen other structured films in order to illustrate the performance advantages over other structured films. Film 1 is a 3M bead coated matte film. Film 2 is a film with patterned white ink on PET. Film 3 is a Keiwa 100-BMUIS film. Film 4 is a bead-coated matte film. Film 5 is a particle bead coated matte film. Film 6 is a Kimoto 100TL4 film. Film 7 is a matte film created by flame embossing the surface of the film. Film 8 is a microreplicated matte film created using electro deposition. Film 9 is a film textured by application and removal of an extrudable, strippable skin. Film 10 is a microreplicated matte film. Film 11 is a matte film with dispersed beads in a gravure coating. Film 12 is a microreplicated, machined matte film. Film 13 is a Dai Nippon DNP M268Y film. As may be clearly noted by reference to FIGS. 8 and 9, a great deal of films according to the current description display very low haze values, and high clarity values. In order to best understand this performance, FIG. 9 may be referenced. This figure provides a scaled haze percentage of 0 to 20%, and clarity range of 0 to 100%.

FIG. 9 displays clearly the levels of performance that the current description reaches that other films do not. For example, the film may be understood in one aspect as having an optical clarity value of less than 50% and an optical haze value of less than 10%. In another aspect, the film of the present description may be understood as having an optical haze of less than about 7.5% and an optical clarity of less than about 60%. Within this performance range there may fall one or two other films (e.g. 3M Particle Matte). However, any such film is distinguishable in that the current film displays this performance with a structured surface with particle sizes of less than about 0.5 microns, or less than about 0.2 microns. In another aspect, the film of the present description may be understood as having an optical haze of less than about 5% and an optical clarity of less than about 70%, where again the structured surface of the film is made up of particles of a size less than about 0.5 microns or less than about 0.2 microns.

In yet another embodiment, as illustrated in FIG. 8 and more clearly, in FIG. 9, the film of the present description has an optical haze of less than about 3% and an optical clarity of less than about 65% or 75%. In another aspect, the film may be understood as possessing an optical haze of less than about 1.5% and an optical clarity of less than about 80%. In a further aspect, the film may be understood as having an optical haze of less than about 1% and an optical clarity of less than about 90%. Also, the current film may be understood as having an optical haze of less than about 20% and an optical clarity of less than about 40%.

In another manner the film of the present description may be understood as having an optical clarity between about 75% and 95% and an optical haze of between about 0 and 1%, where the film is made up of particles of an average size less than about 0.5 microns. Also, the film may have an optical clarity of between about 35% and 70% and an optical haze of between about 1% and 4%. The film may have an optical clarity of between about 30% and 55% and an optical haze of between about 4% and 10%, where the film is made up of particles of an average size less than about 0.5 microns. In another embodiment the film is again made up of particles with an average size of less than about 0.5 microns, where the film's optical clarity values are between about 25% and 45% and optical haze values are between about 10% and 18%.

In yet another aspect, where the structured surface is described as a second film and the substrate is described as a first film, the second film has an optical clarity of less than about 85% and an optical haze of less than about 3.5%.

Figure 10:
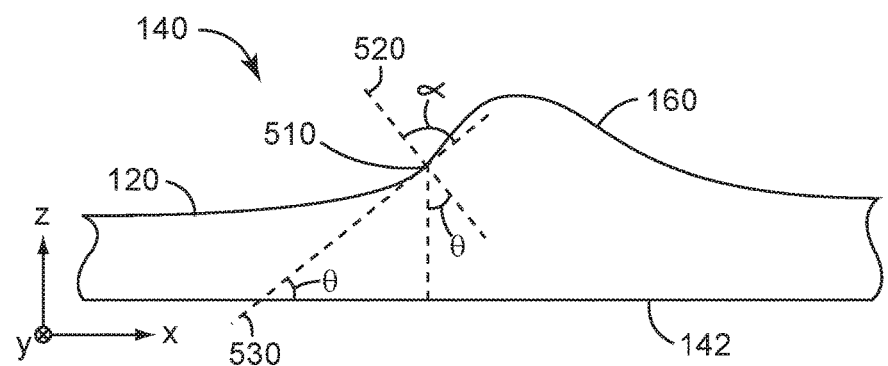
FIG. 10 is a schematic side-view of a microstructure.

FIG. 10 is a schematic side-view of a portion of matte layer 140. In particular, FIG. 10 shows a microstructure 160 in structured surface 120. Microstructure 160 has a slope distribution across the surface of the microstructure. For example, the microstructure has a slope θ at a location 510 where θ is the angle between normal line 520 which is perpendicular to the microstructure surface at location 510 (α=90 degrees) and a tangent line 530 which is tangent to the microstructure surface at the same location. Slope θ is also the angle between tangent line 530 and major surface 142 of the matte layer.

In order to best understand the slope of the microstructures, slope of the structured surface 120 was first taken along an x direction, and then along a y direction, such that:

$$X\text{-slope} = \frac{\partial H(X, y)}{\partial x}, \text{ and} \qquad \text{Equation 1}$$

$$Y\text{-slope} = \frac{\partial H(x, y)}{\partial y} \qquad \text{Equation 2}$$

Where, H(x,y)=the height profile of the surface.

Average x-slope and y-slope were evaluated in a 6 micron interval centered at each pixel. In different embodiments the micron interval may be chosen to be smaller, such as 2 microns, or 3 microns, so long as a constant interval is used. From the x-slope and y-slope data, it is possible to determine a gradient magnitude. This may be understood as follows:

$$GradientMagnitude = \sqrt{\left(\frac{\partial H(x, y)}{\partial x}\right)^2 + \left(\frac{\partial H(x, y)}{\partial y}\right)^2} \qquad \text{Equation 3}$$

Average gradient magnitude was then capable of being evaluated in a 6 μm×6 μm box centered at each pixel. Gradient magnitude was generated within a bin size of 0.5 degrees. Gradient magnitude distribution may be written as $N_G$. It should be understood that in order to find the angle degree value of the x-slope, y-slope and gradient magnitude angles that corresponds to the values above, the arctangent of the values in Equations 1, 2, and 3 should be taken. To better understand the nature of the surface, it is valuable to define the Complement Cumulative Distribution ($F_{CC}(\theta)$). This provides a fraction of the gradient magnitudes that are greater than or equal to angle θ. It is defined as $$F_{CC}(\theta) = \frac{\sum_{q=\theta}^{\infty} N_G(\theta)}{\sum_{q=0}^{\infty} N_G(\theta)} \qquad \text{Equation 4}$$

Therefore, when it is stated that a certain percentage of the structured surface has a slope magnitude that is less than about a certain number of degrees, this figure is derived from the $F_{CC}(\theta)$ in Equation 4. Gradient magnitude corresponds to a combination of the x and y-slopes, and therefore, gradient magnitude may be understood as a general slope magnitude. It should be understood that the terms "gradient magnitude" and "slope magnitude" may be used interchangeably throughout this description and these terms should be understood to have the same meaning.

Figure 11:
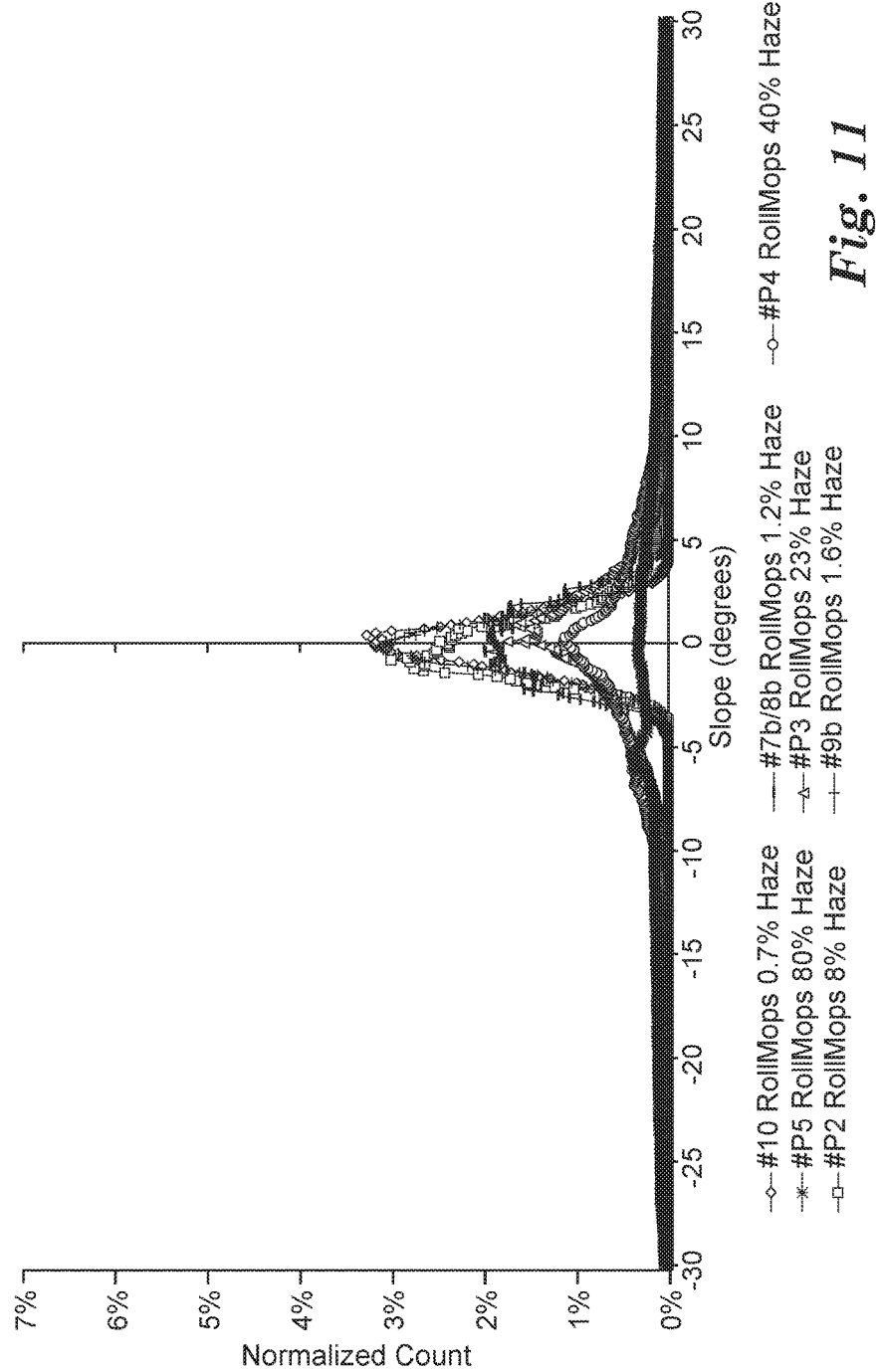
FIG. 11 is a graph of x-slope distributions of the surface of films according to the present description.
Figure 12:
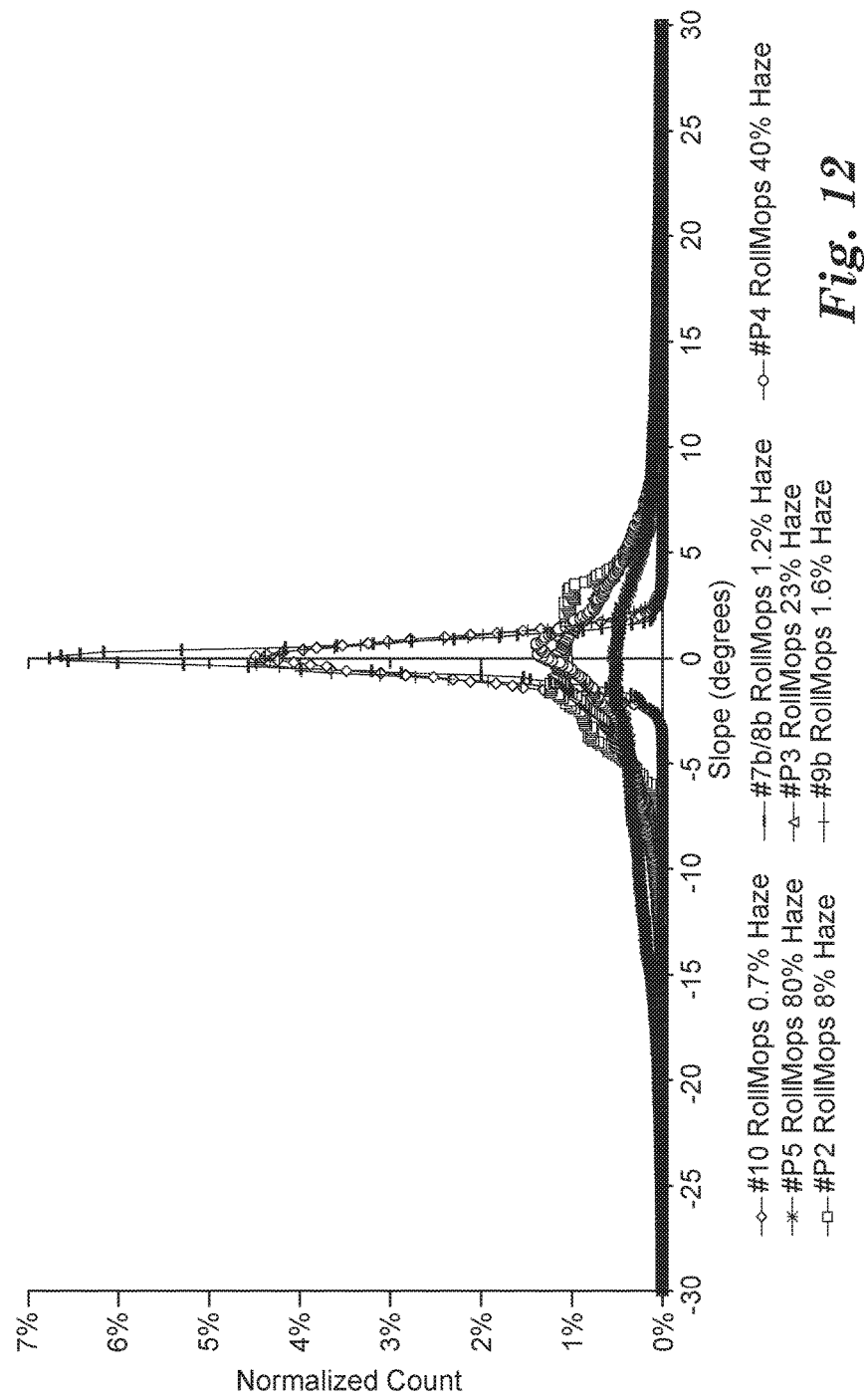
FIG. 12 is a graph of y-slope distributions of the surface of films according to the present description.
Figure 13:
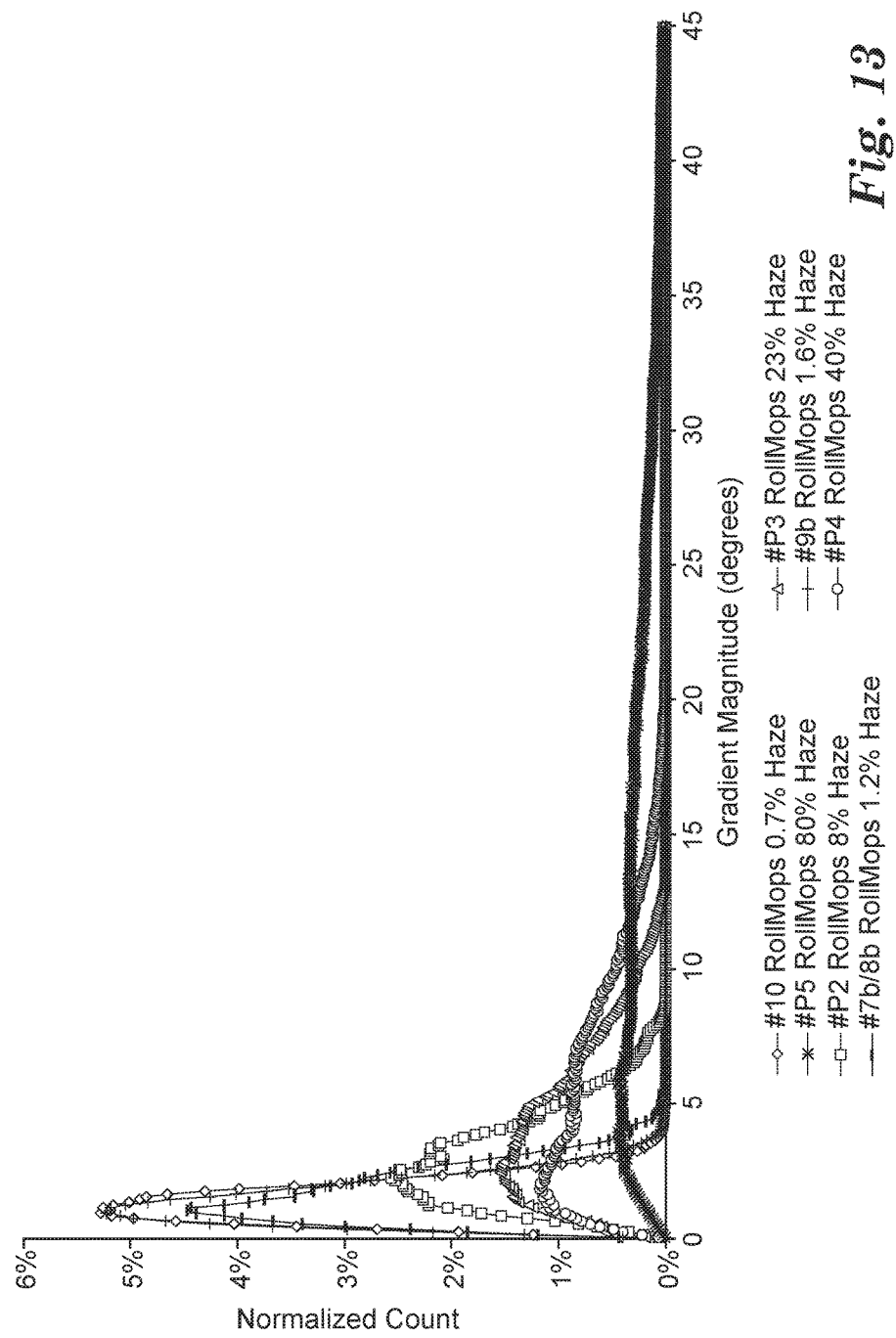
FIG. 13 is a graph of gradient magnitude distributions of the surface of films according to the present description.
Figure 14:
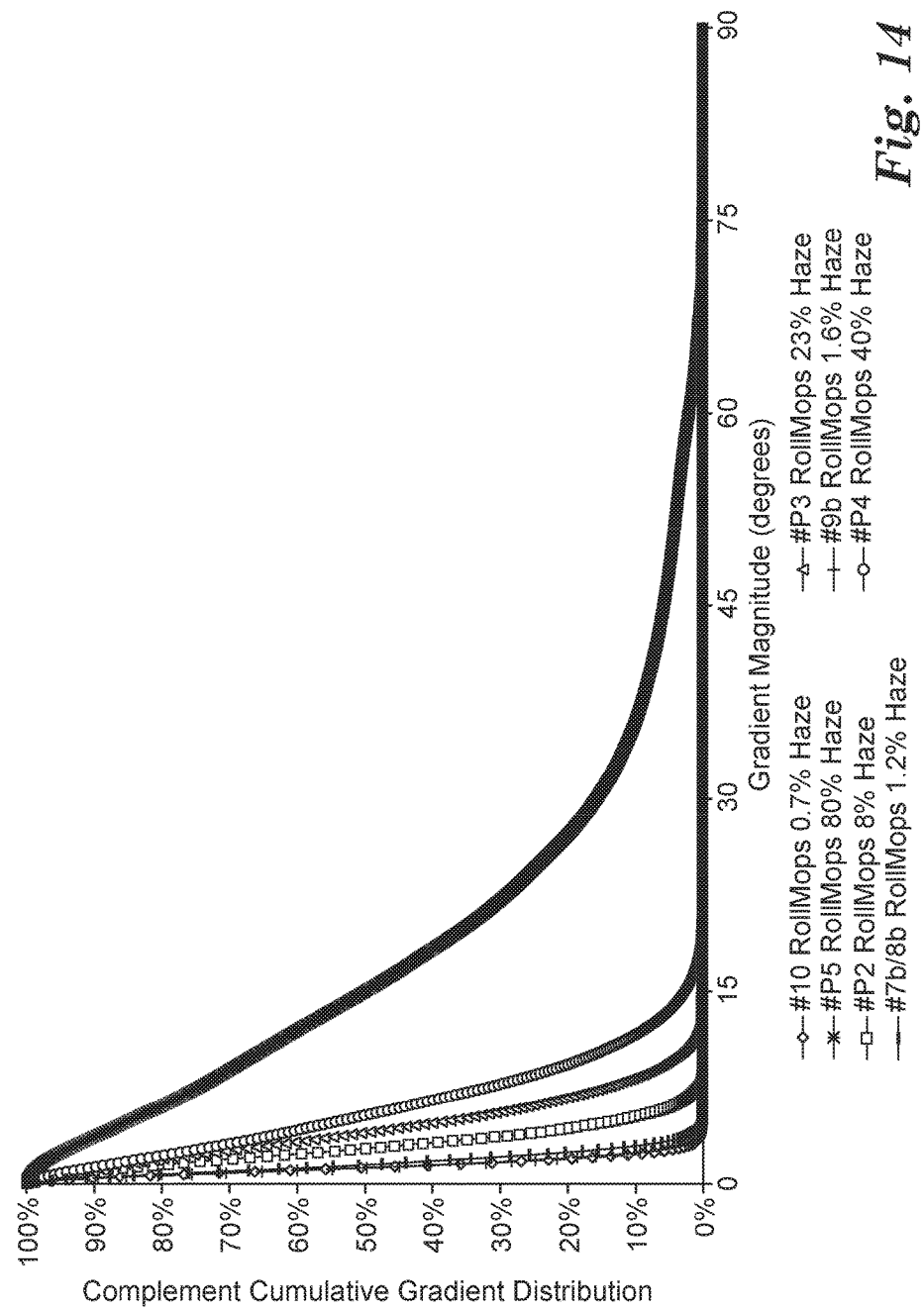
FIG. 14 is graph of the complement cumulative distributions of the surface of films according to the present description.

X-slope distributions and Y-slope distributions were calculated for a number of embodiments of the present description. These films had haze value of 0.7%, 1.2%, 1.6%, 8%, 23%, 40% and 80%. FIG. 11 provides the x-slope distributions for these seven films produced in accordance with the present description. FIG. 12 provides the y-slope distributions for the same seven films. As is readily apparent from the two graphs, the majority of the film's surface has a slope that is very small in both the x and y directions. The films that possessed the lowest haze values (those 1.6% and below) also had the highest normalized count of area that fell at 0 degrees slope in both the x-slope distributions and y-slope distributions. From similar data it was possible to produce a gradient magnitude distribution from the equations presented above for the seven different films produced in accordance with the present description. FIG. 13 displays the gradient magnitude distributions. Again, the graph shows a high amount of surface for each of the films with very low slope. The greatest three peaks were for haze values of 1.6% haze, 1.2% haze and 0.7% haze. This data may be better understood by the corresponding Complement Cumulative Gradient Distribution ($F_{CC}(\theta)$). The $F_{CC}$ graph is shown in FIG. 14. From this it was possible to determine various slopes of the surfaces according to given haze values of the films. Accordingly, the percentage of surface of the film that has a slope below a given number may be quantified according to the various haze values of the film.

According to this understanding, films' surface slopes may be understood as correlated with haze values. Thus, for a film with a haze value of less than about 10%, the film may have at least 85% of the structured surface having a slope magnitude that is less than about 7.5 degrees. In other films, 95% of the structured surface has a slope magnitude that is less than about 10 degrees. Further, 95% of the structured surface may have a slope magnitude that is less than about 5 degrees.

Where the haze value of the film are less than about 7.5%, 90% of the structured surface may have a slope magnitude that is less than about 7.5 degrees. With this same haze value film, 97% of the structured surface may have a slope magnitude that is less than about 10 degrees. Further, 95% of the structured surface may have a slope magnitude that is less than about 5 degrees.

Where the haze value of the film is less than about 5%, 85% of the structured surface may have a slope magnitude that is less than about 5 degrees. With this same haze value, 90% of the structured surface may have a slope that is less than about 5 degrees, or less than about 4 degrees.

In another aspect of the present description, where the haze value of the film is less than about 3%, at least 90% of the structured surface may have a slope magnitude of less than about 5 degrees, or at least 95% of the structured surface may have a slope magnitude that is less than about 5 degrees.

Where the haze value of the film is less than about 1.5%, at least 80% of the structured surface may have a slope magnitude that is less than about 2.5 degrees. With the same haze value film, at least 98% of the structured surface may have a slope magnitude that is less than about 5 degrees.

Where the optical haze value of the film is less than about 1%, at least 90% of the structured surface may have a slope magnitude that is less than about 4 degrees, or 99% of the structured surface may have a slope magnitude less than about 5 degrees.

In an embodiment where optical haze is less than about 20%, at least 90% of the structured surface may have a slope magnitude that is less than about 7 degrees, or less than about 10 degrees.

In another aspect, at least 50% of the optical film may be understood as having a slope of between about 1 degree and 5 degrees.

EXAMPLES

Figure 16A:
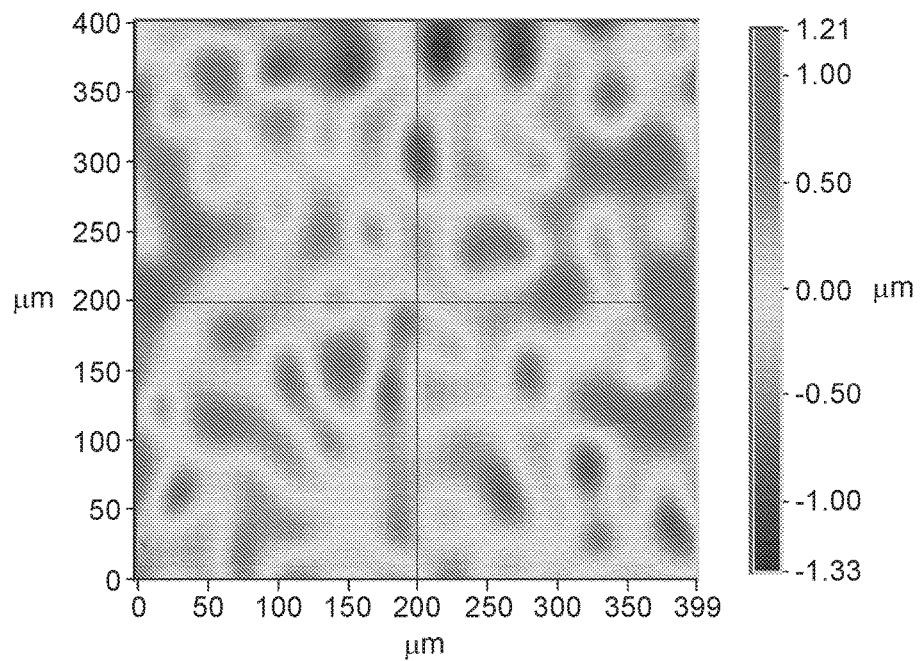
FIG. 16A-D are atomic force microscopy images and corresponding graphs of x and y-profiles of the surface of a film according to the present description.
Figure 16B:
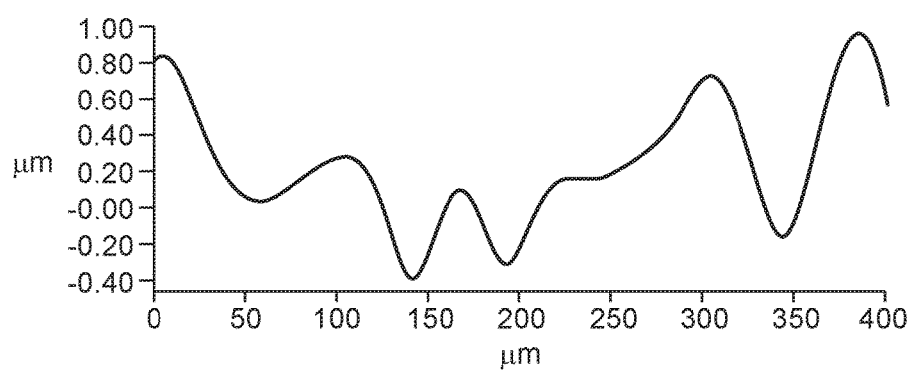
Figure 16C:
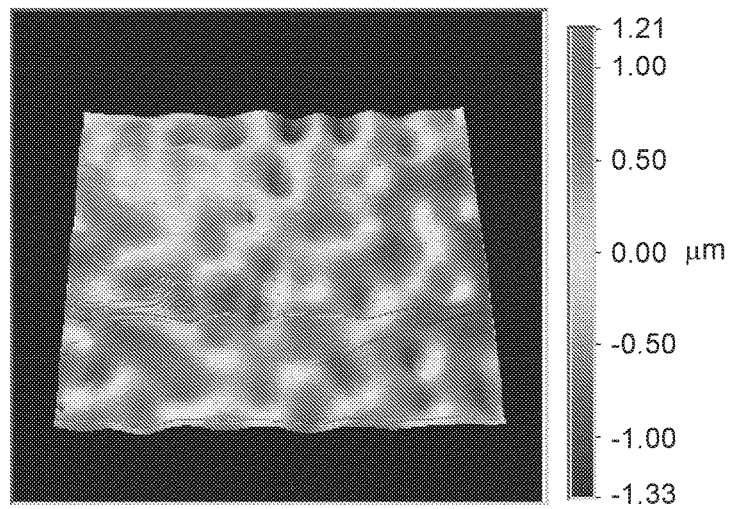
Figure 16D:
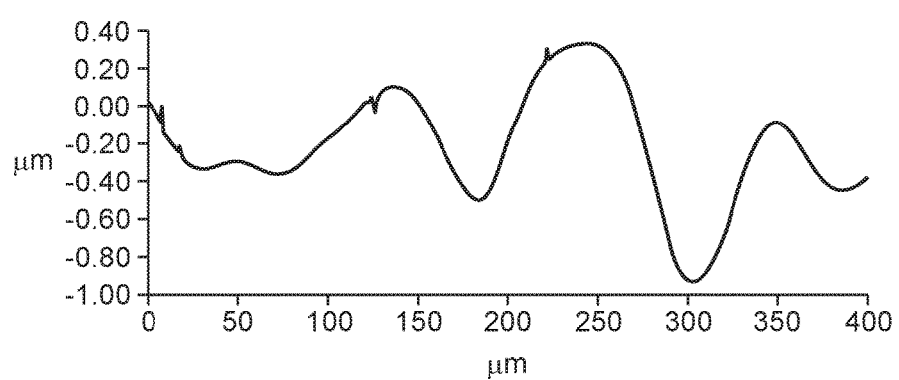

FIGS. 16A and 16C display atomic force microscopy images of a particular film according to the present description along the x and y-profiles. FIGS. 16C and 16D provide the corresponding X and Y profiles of the film respectively. The particular film displayed in the figure had an optical haze of 0.7% and an optical clarity of 70.9%. It may be noted the random distribution and random height changes of the film shown in the X and Y-profiles (FIGS. 16B and 16D). Further, although the profile graphs may appear to have large slopes, the scales on the x and y-axes are vastly disproportionate. The steepest slope of the Y-profile moved from a height level of approximately +0.35 μm to −0.95 μm over a lateral range of approximately 300 μm to 350 μm. This equates to a negative slope of only −0.026, and would further equate to a small angle from the plane of the film. Because y/x is equivalent to both slope and tangent of the slope angle, the arctan(0.026) provides angle. Arctan(0.026) more specifically provides for an angle 1.49 degrees.

Figure 17A:
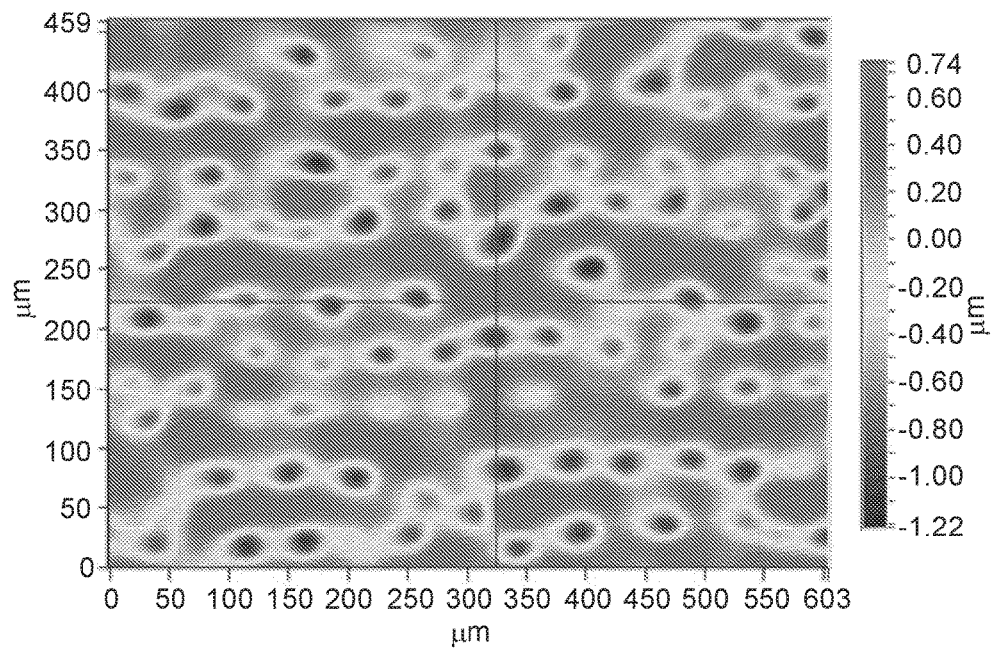
FIG. 17A-D are phase-shift interferometer images and corresponding graphs of x and y-profiles of the surface of a film according to the present description.
Figure 17B:
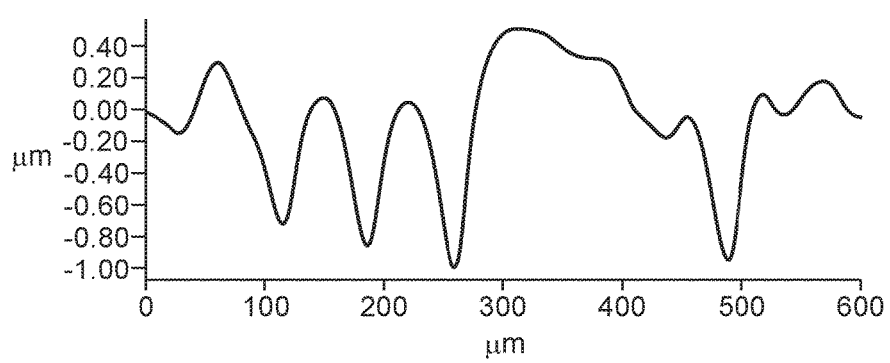
Figure 17C:
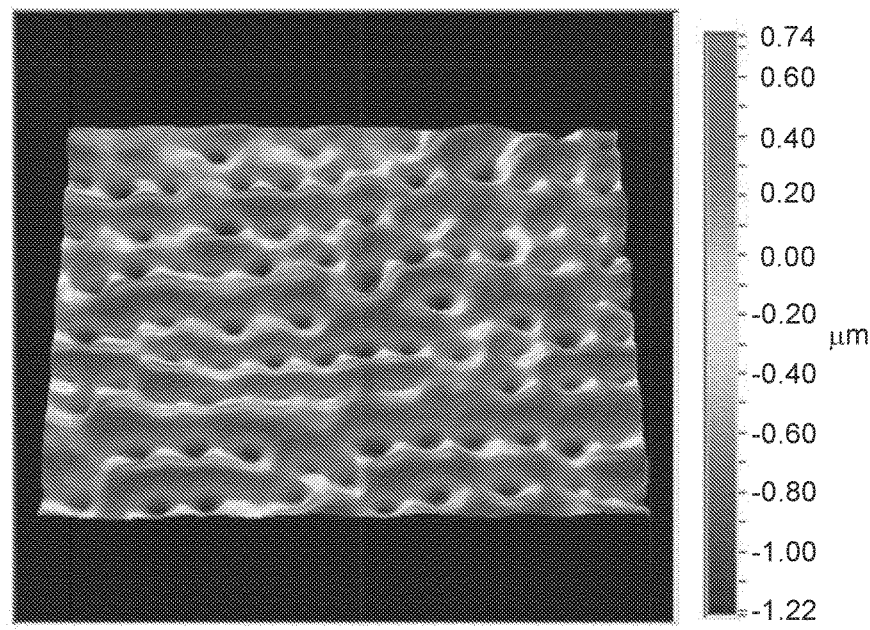
Figure 17D:
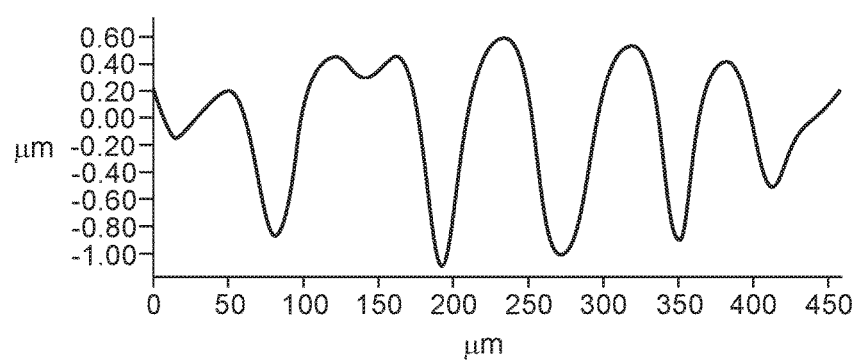

FIGS. 17A and 17C illustrate another image of a given film according to the current description. In this image, a Wyko phase-shift interferometer image was taken of the film along the x and y-profiles. The film had an optical haze value of 1.4% and an optical clarity value of 69.6%. Although the x and y-profiles (as illustrated in FIGS. 17B and 17D, respectively) displayed appeared to show more drastic slopes, again the axes were disproportionate in scale, such that a lateral move of 30 μm in the x-direction (270 to 300 μm) resulted in a z-change of 1.5 μm (−1.0 to +0.5) (see FIG. 17B). Roughly the same scale of vertical deviation was found on the y-profile. The x-profile calculation above showed a slope of 0.05, which is equivalent to an angle (again calculated from arctangent) of 2.86 degrees.

Figure 28:
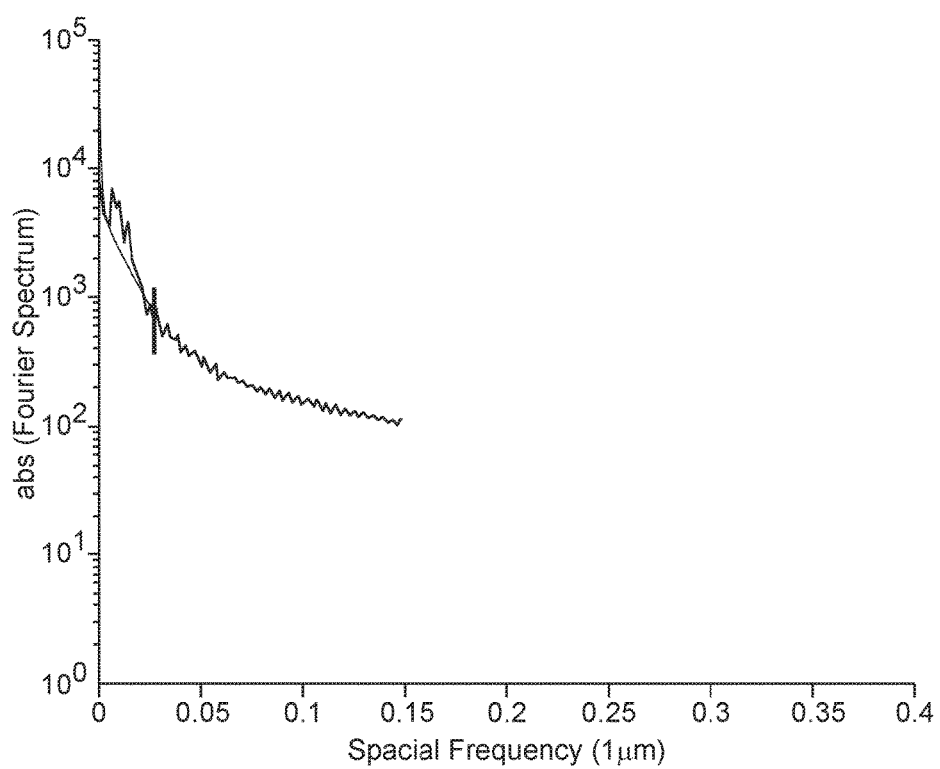
FIG. 28 is a peak profile of a Fourier spectrum of a film according to the present description.

Another sample was measured of a film created in accordance with the present description. A scanning electron microscope image of the surface is shown in FIG. 26. The sample was measured to have a haze value of 2.47% and an optical clarity value of 59.1%. In accordance with the Fourier calculation methods discussed above a Fourier spectrum was created for the film profile. A spectrum from this sample is shown in FIG. 27. From this spectrum, again in accordance with the methods disclosed above and shown in FIGS. 18-24A & B, the peak profile was created for the sample as illustrated in FIG. 28. From this it was possible to determine that the Fourier ratio $RR_1$ value for the film profile was 0.65.

Item 1. An optical film comprising a structured surface having
    an optical haze of less than about 10%;
    an optical clarity of less than about 50%; and
    wherein at least 85% of the structured surface has a slope magnitude that is less than about 7.5 degrees.

Item 2. The optical film on item 1, wherein the structures on the structured surface have an average height of less than about 10 μm.

Item 3. The optical film of item 1, wherein the structured surface is comprised of a substrate capable of hardening.

Item 4. The optical film of item 1, wherein the structured surface has an index of refraction of between about 1.50 and 1.70.

Item 5. The optical film of item 1, wherein the optical film further comprises a plurality of particles having an average size that is less than about 0.5 microns.

Item 6. The optical film of item 5, wherein the optical film further comprises a plurality of particles having an average size that is less than about 0.2 microns.

Item 7. The optical film of item 6, wherein the optical film further comprises a plurality of particles having an average size that is less than about 0.1 microns.

Item 8. The optical film of item 7, wherein the particles are surface-modified.

Item 9. The optical film of item 1, wherein the optical clarity of the structured surface is less than about 45%.

Item 10. The optical film of item 1, wherein at least 95% of the structured surface has a slope magnitude that is less than about 10 degrees.

Item 11. The optical film of item 1, wherein at least 95% of the structured surface has a slope magnitude that is less than about 5 degrees.

Item 12. The optical film of item 1, wherein the structures on the structured surface are distributed such that the film has an $RR_1$ value of less than 2.

Item 13. The optical film of item 12, wherein the structures on the structured surface are distributed such that the film has an $RR_1$ value of less than 1.

Item 14. The optical film of item 1 further comprising a substrate, the structured surface being disposed on the substrate and the structured surface and substrate each having an index of refraction.

Item 15. The optical film of item 14, wherein the index of refraction of the structured surface is less than the index of refraction of the substrate.

Item 16. An optical film comprising a structured surface having
    an optical haze of less than about 7.5%;
    an optical clarity of less than about 60%;
    wherein at least 90% of the structured surface has a slope magnitude that is less than about 7.5 degrees; and
    wherein the optical film comprises a plurality of particles having an average size that is less than about 0.5 microns.

Item 17. The optical film of item 16, wherein the plurality of particles have an average size that is less than about 0.2 microns.

Item 18. The optical film of item 17, wherein the optical film further comprises a plurality of particles having an average size that is less than about 0.1 microns.

Item 19. The optical film of item 18, wherein the particles are surface-modified.

Item 20. The optical film of item 16, wherein the structures on the structured surface have an average height of less than about 7.5 μm.

Item 21. The optical film of item 16, wherein at least 97% of the structured surface has a slope magnitude that is less than about 10 degrees.

Item 22. The optical film of item 16, wherein at least 95% of the structured surface has a slope magnitude that is less than about 5 degrees.

Item 23. The optical film of item 16, wherein the optical clarity of the structured surface is less than about 55%.

Item 24. The optical film of item 16, wherein the structures on the structured surface are distributed such that the film has an $RR_1$ value of less than 2.

Item 25. The optical film of item 24, wherein the structures on the structured surface are distributed such that the film has an $RR_1$ value of less than 1.

Item 26. The optical film of item 16, further comprising a substrate, the structured surface being disposed on the substrate and the structured surface and substrate each having an index of refraction.

Item 27. The optical film of item 26, wherein the index of refraction of the structured surface is less than the index of refraction of the substrate.

Item 28. The optical film of item 26, wherein the structured surface has an index of refraction of between about 1.50 and 1.70.

Item 29. An optical film comprising a structured surface having
an optical haze of less than about 5%;
an optical clarity of less than about 70%;
wherein at least 85% of the structured surface has a slope magnitude that is less than about 5 degrees; and
wherein the optical film comprises a plurality of particles having an average size that is less than about 0.5 microns.

Item 30. The optical film of item 29, wherein the plurality of particles have an average size that is less than about 0.2 microns.

Item 31. The optical film of item 30, wherein the optical film further comprises a plurality of particles having an average size that is less than about 0.1 microns.

Item 32. The optical film of item 31, wherein the particles are surface-modified.

Item 33. The optical film of item 29, wherein the structures on the structured surface have an average height of less than about 5 μm.

Item 34. The optical film of item 29, wherein the optical clarity of the structured surface is less than about 60%.

Item 35. The optical film of item 29, wherein at least 90% of the structured surface has a slope that is less than about 4 degrees.

Item 36. The optical film of item 29, wherein at least 90% of the structured surface has a slope magnitude that is less than about 5 degrees.

Item 37. The optical film of item 29, wherein the structures on the structured surface are distributed such that the film has an $RR_1$ value of less than 2.

Item 38. The optical film of item 37, wherein the structures on the structured surface are distributed such that the film has an $RR_1$ value of less than 1.

Item 39. The optical film of item 29, further comprising a substrate, the structured surface being disposed on the substrate and the structured surface and substrate each having an index of refraction.

Item 40. The optical film of item 39, wherein the index of refraction of the structured surface is less than the index of refraction of the substrate.

Item 41. The optical film of item 39, wherein the structured surface has an index of refraction of between about 1.50 and 1.70.

Item 42. An optical film comprising a structured surface having
an optical haze of less than about 3%;
an optical clarity of less than about 65%; and
wherein at least 90% of the structured surface has a slope magnitude that is less than about 5 degrees.

Item 43. The optical film of item 42, wherein the structures on the structured surface have an average height of less than 2.5 μm.

Item 44. The optical film of item 42, wherein the optical clarity of the structured surface is less than about 60%.

Item 45. The optical film of item 42, wherein the optical film further comprises a plurality of particles having an average size that is less than about 0.5 microns.

Item 46. The optical film of item 45, wherein the plurality of particles have an average size that is less than about 0.2 microns.

Item 47. The optical film of item 46, wherein the optical film further comprises a plurality of particles having an average size that is less than about 0.1 microns.

Item 48. The optical film of item 47, wherein the particles are surface-modified.

Item 49. The optical film of item 42, wherein at least 95% of the structured surface has a slope magnitude that is less than about 5 degrees.

Item 50. The optical film of item 39, wherein the structures on the structured surface are distributed such that the film has an $RR_1$ value of less than 2.

Item 51. The optical film of item 50, wherein the structures on the structured surface are distributed such that the film has an $RR_1$ value of less than 1.

Item 52. The optical film of item 52 further comprising a substrate, the structured surface being disposed on the substrate and the structured surface and substrate each having an index of refraction.

Item 53. The optical film of item 52, wherein the index of refraction of the structured surface is less than the index of refraction of the substrate.

Item 54. The optical film of item 52, wherein the structured surface has an index of refraction of between about 1.50 and 1.70.

Item 55. An optical film comprising a structured surface having
an optical haze of less than about 1.5%;
an optical clarity of less than about 80%;
wherein at least 80% of the structured surface has a slope magnitude that is less than about 2.5 degrees.

Item 56. The optical film of item 55, wherein the optical clarity of the structured surface is less than about 75%.

Item 57. The optical film of item 55, wherein the optical film further comprises a plurality of particles having an average size that is less than about 0.5 microns.

Item 58. The optical film of item 57, wherein the plurality of particles have an average size that is less than about 0.2 microns.

Item 59. The optical film of item 58, wherein the optical film further comprises a plurality of particles having an average size that is less than about 0.1 microns.

Item 60. The optical film of item 59, wherein the particles are surface-modified.

Item 61. The optical film of item 55, wherein at least 98% of the structured surface has a slope magnitude that is less than about 5 degrees.

Item 62. The optical film of item 55, wherein the structures on the structured surface are distributed such that the film has an $RR_1$ value of less than 2.

Item 63. The optical film of item 62, wherein the structures on the structured surface are distributed such that the film has an $RR_1$ value of less than 1.

Item 64. The optical film of item 55 further comprising a substrate, the structured surface being disposed on the substrate and the structured surface and substrate each having an index of refraction.

Item 65. The optical film of item 64, wherein the index of refraction of the structured surface is less than the index of refraction of the substrate.

Item 66. The optical film of item 64, wherein the structured surface has an index of refraction of between about 1.50 and 1.70.

Item 67. An optical film comprising a structured surface having
- an optical haze of less than about 1%;
- an optical clarity of less than about 90%;
- wherein at least 90% of the structured surface has a slope magnitude that is less than about 4 degrees.

Item 68. The optical film of item 67, wherein at least 99% of the structured surface has a slope magnitude that is less than about 5 degrees.

Item 69. An optical film comprising a structured surface having
- an optical haze of less than about 20%;
- an optical clarity of less than about 40%; and
- wherein at least 90% of the structured surface has a slope magnitude that is less than about 10 degrees.

Item 70. The optical film of item 69, wherein the structures on the structured surface are distributed such that the film has an $RR_1$ value of less than 2.

Item 71. The optical film of item 70, wherein the structures on the structured surface are distributed such that the film has an $RR_1$ value of less than 1.

Item 72. The optical film of item 69, wherein at least 90% of the structured surface has a slope magnitude that is less than about 7 degrees.

Item 73. An optical film comprising:
- a first structured surface comprising a plurality of prismatic structures; and
- a second structured surface opposing the first structured surface and comprising a plurality of microstructures,
- wherein an effective transmission of the film is not more than 1% less than a film with a comparable construction except for a smooth, non-structured second surface.

Item 74. The optical stack of item 73, wherein the effective transmission of the film is more than a film with a comparable construction except for a second optical film with a smooth rather than structured surface.

Item 75. The film of item 73, wherein the film has an optical gain of at least about 1.5.

Item 76. The film of item 73, wherein the second structured surface has an optical haze of less than about 20% and an optical clarity of less than about 40%.

Item 77. The film of item 73, wherein the second structured surface has an optical haze less than about 10% and an optical clarity of less than about 50%.

Item 78. The film of item 73, wherein the second structured surface has an optical haze of less than about 7.5% and an optical clarity of less than about 60%.

Item 79. The film of item 73, wherein the second structured surface has an optical haze of less than about 5% and an optical clarity of less than about 70%.

Item 80. The film of item 73, wherein the second structured surface has an optical haze of less than about 3% and an optical clarity of less than about 75%.

Item 81. The film of item 73, wherein the second structured surface has an optical haze of less than about 1.5% and an optical clarity of less than about 80%.

Item 82. The film of item 73, wherein the second structured surface has an optical haze of less than about 1% and an optical clarity of less than about 90%.

Item 83. The film of item 73, wherein the first and second structured surfaces are comprised of different materials.

Item 84. An optical film stack comprising:
- a first optical film; and
- a second optical film disposed on and optically coupled to the first optical film;
- wherein the second optical film comprises a structured surface; and
- further wherein an effective transmission of the film stack is not more than 1% less than a film stack with a comparable construction except for a second optical film with a smooth rather than structured surface.

Item 85. The film stack of item 84, wherein the effective transmission of the film stack is more than a film stack with a comparable construction except for a second optical film with a smooth rather than structured surface.

Item 86. The film stack of item 84, wherein the first optical film comprises a brightness enhancing film.

Item 87. The film stack of item 84, wherein the first optical film comprises a polarizer.

Item 88. The film stack of item 84, wherein the first optical film comprises polycarbonate, PET, TAC, or S-BOPP.

Item 89. The film stack of item 84, wherein the first optical film comprises a multiple layers.

Item 90. The film stack of item 84, wherein the first optical film comprises a reflective polarizer.

Item 91. The film stack of item 84, wherein the first optical film has a first index of refraction and the second optical film has a second index of refraction less than the first index of refraction.

Item 92. The film stack of item 84, further comprising a third optical film disposed between the first optical film and the second optical film.

Item 93. The film stack of item 84, wherein the film stack has an optical gain of at least about 1.5.

Item 94. The film stack of item 84, wherein the structured surface of the second film has an optical haze of less than about 20% and an optical clarity of less than about 40%.

Item 95. The film stack of item 84, wherein the structured surface of the second film has an optical haze less than about 10% and an optical clarity of less than about 50%

Item 96. The film stack of item 84, wherein the structured surface of the second film has an optical haze of less than about 7.5% and an optical clarity of less than about 60%

Item 97. The film stack of item 84, wherein the structured surface of the second film has an optical haze of less than about 5% and an optical clarity of less than about 70%.

Item 98. The film stack of item 84, wherein the structured surface of the second film has an optical haze of less than about 3% and an optical clarity of less than about 75%.

Item 99. The film stack of item 84, wherein the structured surface of the second film has an optical haze of less than about 1.5% and an optical clarity of less than about 80%.

Item 100. The film stack of item 84, wherein the structured surface of the second film has an optical haze of less than about 1% and an optical clarity of less than about 90%.

Item 101. The film stack of item 84, wherein the first film has an optical haze of less than about 2%.

Item 102. An optical film comprising:
a plurality of microstructures randomly distributed on a surface of the optical film, where randomly distributed is a Fourier $RR_1$ value of less than 2;
wherein 50% of the surface of the optical film has a slope of between about 1 degree and 5 degrees.

Item 103. The optical film of item 102, where randomly distributed is an $RR_1$ value of less than 1.

Item 104. An optical film comprising a structured surface, wherein the optical film has an optical clarity between about 75% and 95% and an optical haze of between about 0 and 1%, the optical film comprising a plurality of particles having an average size that is less than about 0.5 microns.

Item 105. An optical film comprising a structured surface, wherein the optical film has an optical clarity of between about 35% and 70% and an optical haze of between about 1% and 4%.

Item 106. An optical film comprising a structured surface, wherein the optical film has an optical clarity of between about 30% and 55% and an optical haze of between about 4% and 10%, the optical film comprising a plurality of particles having an average size that is less than about 0.5 microns.

Item 107. An optical film comprising a structured surface, wherein the optical film has an optical clarity of between about 25% and 45% and an optical haze of between about 10% and 18%, the optical film comprising a plurality of particles having an average size that is less than about 0.5 microns.

Item 108. A backlight for illuminating a display comprising:
a light source;
a first optical film receiving light from the light source; and
a second optical film; the first optical film disposed on and optically coupled to the second optical film and comprising a plurality of microstructures,
wherein an optical clarity of the second film is less than about 85% and an optical haze of the second film is less than about 3.5%

Item 109. An optical film comprising a structured surface, wherein the optical clarity of the structured surface is less than ((−3×Optical Haze)+80%).

Item 110. The optical film of item 109, wherein the optical clarity of the structured surface is greater than 20%.

Item 111. A method of making a film having a matte finish, the method comprising:
Providing a coated substrate comprising a coatable material disposed on a substrate, the coatable material providing a first major surface of the coated substrate;
Changing the viscosity of the coatable material from the initial viscosity to a second viscosity;
Passing the coated substrate through a first roller to remove any debris;
Contacting the first major surface of the coated substrate with at least one face-side roller to impart a matte finish; and
Optionally, hardening the coatable material to provide the film.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

We claim:

1. An optical film comprising a structured surface having an optical haze of less than about 10%;
an optical clarity of less than about 50%; and
wherein at least 90% of the structured surface has a slope magnitude that is less than about 5 degrees.

2. The optical film of claim 1, wherein structures on the structured surface are distributed such that the film has an $RR_1$ value of less than 2.

3. The optical film of claim 1, wherein structures on the structured surface have an average height of less than about 10 µm.

4. The optical film of claim 1, wherein the optical film further comprises a plurality of particles having an average size that is less than about 0.5 microns.

5. The optical film of claim 1, wherein at least 95% of the structured surface has a slope magnitude that is less than about 5 degrees.

6. An optical film comprising a structured surface having an optical haze of less than about 7.5%;
an optical clarity of less than about 60%;
wherein at least 90% of the structured surface has a slope magnitude that is less than about 5 degrees; and
wherein the optical film comprises a plurality of particles having an average size that is less than about 0.5 microns.

7. The optical film of claim 6, wherein structures on the structured surface are distributed such that the film has an $RR_1$ value of less than 2.

8. The optical film of claim 6, wherein structures on the structured surface have an average height of less than about 7.5 µm.

9. The optical film of claim 6, wherein at least 95% of the structured surface has a slope magnitude of less than about 5 degrees.

10. An optical film comprising a structured surface having an optical haze of less than about 3%;
an optical clarity of less than about 65%; and
wherein at least 90% of the structured surface has a slope magnitude that is less than about 5 degrees.

11. The optical film of claim 10, wherein structures on the structured surface are distributed such that the film has an $RR_1$ value of less than 2.

12. The optical film of claim 10, wherein structures on the structured surface have an average height of less than 2.5 µm.

13. The optical film of claim 10, wherein the optical film further comprises a plurality of particles having an average size that is less than about 0.5 microns.

14. The optical film of claim 13, wherein the plurality of particles have an average size that is less than about 0.2 microns.

15. An optical film comprising:
a plurality of microstructures distributed on a surface of the optical film such that the optical film has a Fourier $RR_1$ value of less than 2;
wherein 50% of the surface of the optical film has a slope of between about 1 degree and 5 degrees; and
wherein at least 90% of the surface of the optical film has a slope magnitude that is less than about 5 degrees.

16. The optical film of claim 15, wherein the $RR_1$ value is less than 1.

* * * * *